United States Patent
Kitagishi et al.

(10) Patent No.: US 11,580,615 B2
(45) Date of Patent: Feb. 14, 2023

(54) ROUTING A MOBILE VEHICLE BASED ON RIDER CHARACTERISTICS

(71) Applicant: YAHOO JAPAN CORPORATION, Tokyo (JP)

(72) Inventors: Ikuo Kitagishi, Tokyo (JP); Atsushi Hashimoto, Tokyo (JP); Takanori Hirohashi, Tokyo (JP); Yuki Taguchi, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 390 days.

(21) Appl. No.: 16/056,895

(22) Filed: Aug. 7, 2018

(65) Prior Publication Data

US 2019/0156451 A1    May 23, 2019

(30) Foreign Application Priority Data

Nov. 20, 2017    (JP) .............................. JP2017-223180

(51) Int. Cl.
*G06Q 50/30* (2012.01)
*G08G 1/00* (2006.01)
*G06Q 30/0283* (2023.01)
*G06Q 10/02* (2012.01)

(52) U.S. Cl.
CPC ............. *G06Q 50/30* (2013.01); *G06Q 10/02* (2013.01); *G06Q 30/0283* (2013.01); *G08G 1/202* (2013.01); *G08G 1/205* (2013.01)

(58) Field of Classification Search
CPC ........ G06Q 50/30; G06Q 10/02; G08G 1/202; G08G 1/205; G01C 21/3453; G01C 21/3484
See application file for complete search history.

(56) References Cited

U.S. PATENT DOCUMENTS

| | | | |
|---|---|---|---|
| 9,562,785 B1 * | 2/2017 | Racah ................. | G01C 21/3438 |
| 2013/0159028 A1 * | 6/2013 | Lerenc ............... | G06Q 10/1095 |
| | | | 705/5 |

(Continued)

FOREIGN PATENT DOCUMENTS

| JP | 2004-227262 A | 8/2004 |
|---|---|---|
| JP | 2015-184779 A | 10/2015 |

(Continued)

OTHER PUBLICATIONS

C. Chen, D. Zhang, N. Li and Z. -H. Zhou, "B-Planner: Planning Bidirectional Night Bus Routes Using Large-Scale Taxi GPS Traces ," in IEEE Transactions on Intelligent Transportation Systems, vol. 15, No. 4, pp. 1451-1465, Aug. 2014, doi: 10.1109/TITS.2014.2298892. (Year: 2014).*

(Continued)

*Primary Examiner* — Scott M Tungate
(74) *Attorney, Agent, or Firm* — Oliff PLC

(57) ABSTRACT

An information processing apparatus according to the present application includes an acquiring unit and a deciding unit. The acquiring unit acquires attribute information on a user. The deciding unit decides, based on the attribute information acquired by the acquiring unit, a placement position in which a virtual riding point that corresponds to a riding point that is used for the user to ride in a moving vehicle and that is virtually set is placed.

14 Claims, 15 Drawing Sheets

(56) References Cited

U.S. PATENT DOCUMENTS

| | | | | |
|---|---|---|---|---|
| 2015/0095198 A1* | 4/2015 | Eramian | ............ | G06Q 30/0629 |
| | | | | 705/26.64 |
| 2015/0238815 A1* | 8/2015 | Lee | ...................... | G01C 21/343 |
| | | | | 701/533 |
| 2018/0156623 A1* | 6/2018 | West | ................... | G01C 21/3423 |
| 2018/0238694 A1* | 8/2018 | Bellotti | .............. | G01C 21/3423 |

FOREIGN PATENT DOCUMENTS

| | | |
|---|---|---|
| JP | 2017-182137 A | 10/2017 |
| JP | 6415672 B1 | 10/2018 |

OTHER PUBLICATIONS

Apr. 10, 2018 Office Action issued in Japanese Patent Application No. 2017-223180.

Jun. 22, 2021 Office Action issued in Japanese Patent Application No. 2018-115593.

Jan. 4, 2022 Office Action issued in Japanese Patent Application No. 2018-115593.

* cited by examiner

FIG.4

| PREFECTURES | COMPANY | PATH ID | POSITION INFORMATION (COORDINATES) | ... |
|---|---|---|---|---|
| TOKYO | TK TRAFFIC, INC. | 20 | X1, Y1 | ... |
| | | 21 | X2, Y2 | ... |
| | | 22 | X3, Y3 | ... |
| | ... | ... | ... | ... |
| KANAGAWA PREFECTURE | ... | ... | ... | ... |
| ... | ... | ... | ... | ... |

| COMPANY | PATH ID | SCHEDULE INFORMATION | ... |
|---|---|---|---|
| TK TRAFFIC, INC. | 20 | DA20 | ... |
| | 21 | DA21 | ... |
| | 22 | DA22 | ... |
| | ... | ... | ... |

| USER ID | AGE | GENDER | HEALTH CONDITION | PHYSICAL DISABILITY | INFANT INFORMATION | ... |
|---|---|---|---|---|---|---|
| U1 | 33 | FEMALE | PREGNANT WOMAN | NULL | ACCOMPANYING ELEMENTARY SCHOOL STUDENT | ... |
| U2 | 20 | MALE | GOOD | NULL | NONE | ... |
| U3 | 55 | MALE | GOOD | NULL | NONE | ... |
| U4 | 43 | MALE | BAD | WHEELCHAIR | NONE | ... |
| U5 | 78 | FEMALE | BAD | DISEASE | NONE | ... |
| ... | ... | ... | ... | ... | ... | ... |

FIG.7

| COMPANY | PATH ID | DATE AND TIME INFORMATION | DELAY INFORMATION | ... |
|---|---|---|---|---|
| TK TRAFFIC, INC. | 20 | 8:15 - 8:30, SEPTEMBER 5, 2017 | SECTION X1 | ... |
| | | 8:05 - 8:30, SEPTEMBER 4, 2017 | SECTION X1 | ... |
| | | ... | ... | ... |
| ... | ... | ... | ... | ... |

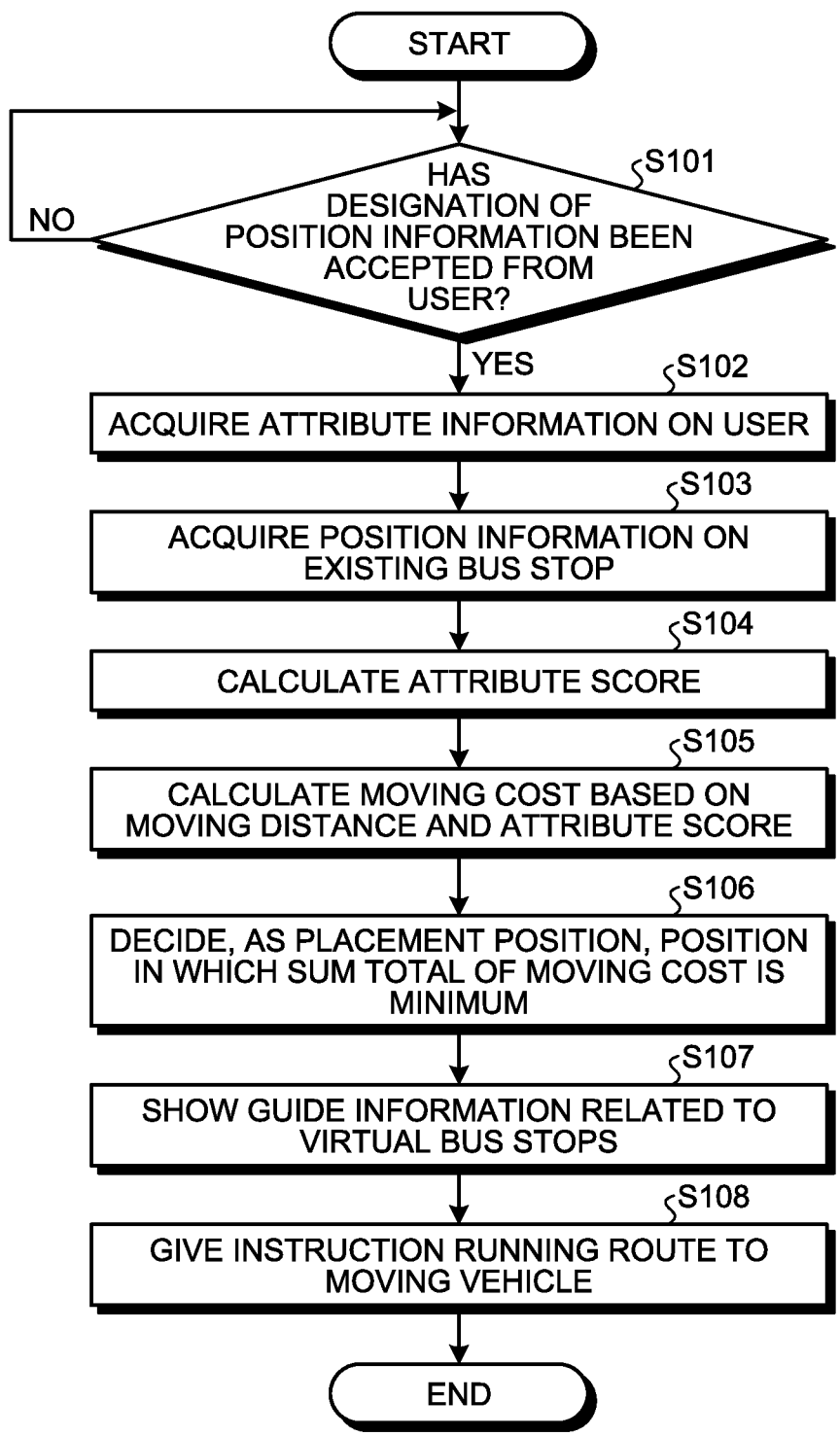

FIG.9

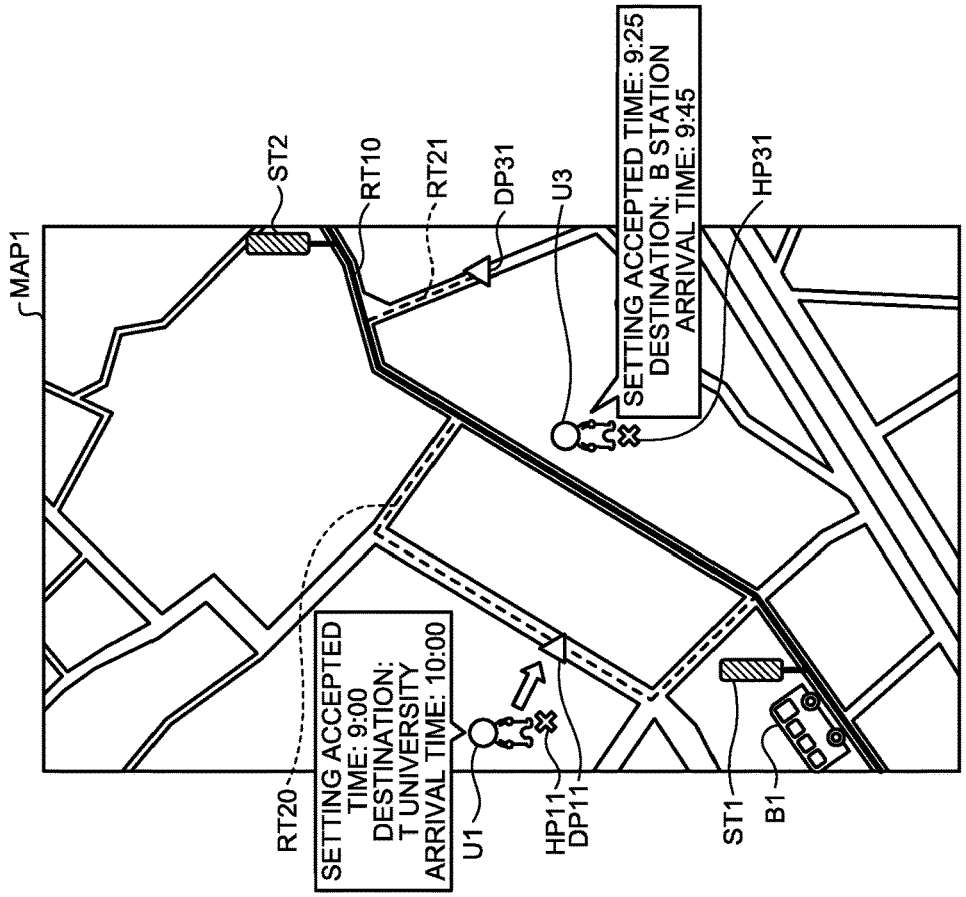

"ABOUT USER U1"

S11 DECIDE PLACEMENT POSITION RELATED TO BUS THAT CAN ARRIVE AT DESTINATION "T UNIVERSITY" AT TIME "10:00"

S12 IS PREDICTED ARRIVAL TIME TO DESTINATION "T UNIVERSITY" NOT AFTER "10:00" WHEN SELECTING DETOUR ROUTE RT20 THAT PASSES ALONG PLACEMENT POSITION DP11? (IF ARRIVAL TIME IS AFTER "10:00", RE-DECIDE PLACEMENT POSITION BASED ON SUBSEQUENT OPERATION SCHEDULE)

S13 CALCULATE NEEDED TIME T11 NEEDED FROM CURRENT POSITION HP11 TO DESIRED POSITION DP11

S14 CALCULATE NEEDED TIME T12 NEEDED FROM CURRENT POSITION OF ON-DEMAND BUS B1 TO PLACEMENT POSITION DP11

S15 CALCULATE, BASED ON NEEDED TIME T11 AND NEEDED TIME T12, MOVING START TIME SUCH THAT WAITING TIME AT DESIRED POSITION DP11 BECOMES FURTHER SHORT

S16 SHOW CALCULATED MOVING START TIME

"ABOUT USER U3"

S21 IS DESTINATION "B STATION" PRESENT ON OPERATION ROUTE OF ON-DEMAND BUS B1 THAT RUNS, FOR USER U1, DETOUR ROUTE RT20 AS DETOUR?

S22 IF "B STATION" IS PRESENT, IS PREDICTED ARRIVAL TIME TO DESTINATION "T UNIVERSITY" NOT AFTER "10:00" WHEN ON-DEMAND BUS B1 PASSES ALONG DETOUR ROUTES RT20 AND RT21 (AT THIS TIME, CONSIDERING NEEDED TIME TO STOP BY B STATION)

S23 DECIDE DESIRED POSITION DP31 AS PLACEMENT POSITION

S24 CALCULATE NEEDED TIME 31 NEEDED FROM CURRENT POSITION HP31 TO DESIRED POSITION DP31

S25 CALCULATE NEEDED TIME T32 NEEDED FROM CURRENT POSITION OF ON-DEMAND BUS B1 TO PLACEMENT POSITION DP31

S26 CALCULATE MOVING START TIME BASED ON NEEDED TIME T31 AND NEEDED TIME T32 SUCH THAT WAITING TIME AT PLACEMENT POSITION DP31 BECOMES FURTHER SHORT

S27 SHOW CALCULATED MOVING START TIME

ROUTING A MOBILE VEHICLE BASED ON RIDER CHARACTERISTICS

CROSS-REFERENCE TO RELATED APPLICATION(S)

The present application claims priority to and incorporates by reference the entire contents of Japanese Patent Application No. 2017-223180 filed in Japan on Nov. 20, 2017.

BACKGROUND OF THE INVENTION

1. Field of the Invention

The embodiments of the present invention relates to an information processing apparatus, an information processing method, and an information processing program.

2. Description of the Related Art

Conventionally, a technology for managing an operation of buses has been disclosed.

For example, Japanese Laid-open Patent Publication No. 2015-184779 discloses a technology for creating timetables of target paths on which moving vehicles run.

However, in the conventional technology described above, the convenience of users who use moving vehicles is not always enhanced. For example, in the conventional technology described above, based on demands for moving in a time zone in a target path that is targeted for creating the timetable and based on the capacity of the moving vehicles, the number of needed moving vehicles in the time zone is calculated. Then, in the conventional technology described above, based on a period of time in the time zone that is targeted for creating the timetable and based on the calculated number of needed moving vehicles, operation intervals in the time zone targeted for creating the timetable are calculated and then, based on the calculated operation intervals, the timetable that is used to operate the moving vehicles running in the target path in the time zone targeted for creating the timetable is created.

In the conventional technology described above, because it is possible to create operation timetables with high accuracy, this makes it possible for, for example, an operation manager who manages the operation of the moving vehicles to reduce a delay of each of the moving vehicles and, consequently, there is a possibility of increasing the operational track record. Namely, the conventional technology described above has the potential of producing a higher effect for the operation manager. However, in the conventional technology described above, the convenience of the users who use the moving vehicle is not always enhanced.

SUMMARY OF THE INVENTION

It is an object of the present invention to at least partially solve the problems in the conventional technology.

According to one aspect of an embodiment, An information processing apparatus includes an acquiring unit that acquires attribute information on a user. The information processing apparatus includes a deciding unit that decides, based on the attribute information acquired by the acquiring unit, a placement position in which a virtual riding point that corresponds to a riding point that is used for the user to ride in a moving vehicle and that is virtually set is placed.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an example of a virtual bus stop position information storage unit according to the first embodiment;

FIG. 5 is a diagram illustrating an example of an operation schedule storage unit according to the first embodiment;

FIG. 6 is a diagram illustrating an example of a user information storage unit according to the first embodiment;

FIG. 7 is a diagram illustrating an example of an operational track record storage unit according to the first embodiment;

FIG. 8 is a flowchart illustrating an example of the information processing according to the first embodiment;

FIG. 9 is a diagram illustrating an example of information processing according to a modification in the first embodiment;

DETAILED DESCRIPTION OF THE PREFERRED EMBODIMENTS

Figure 1:
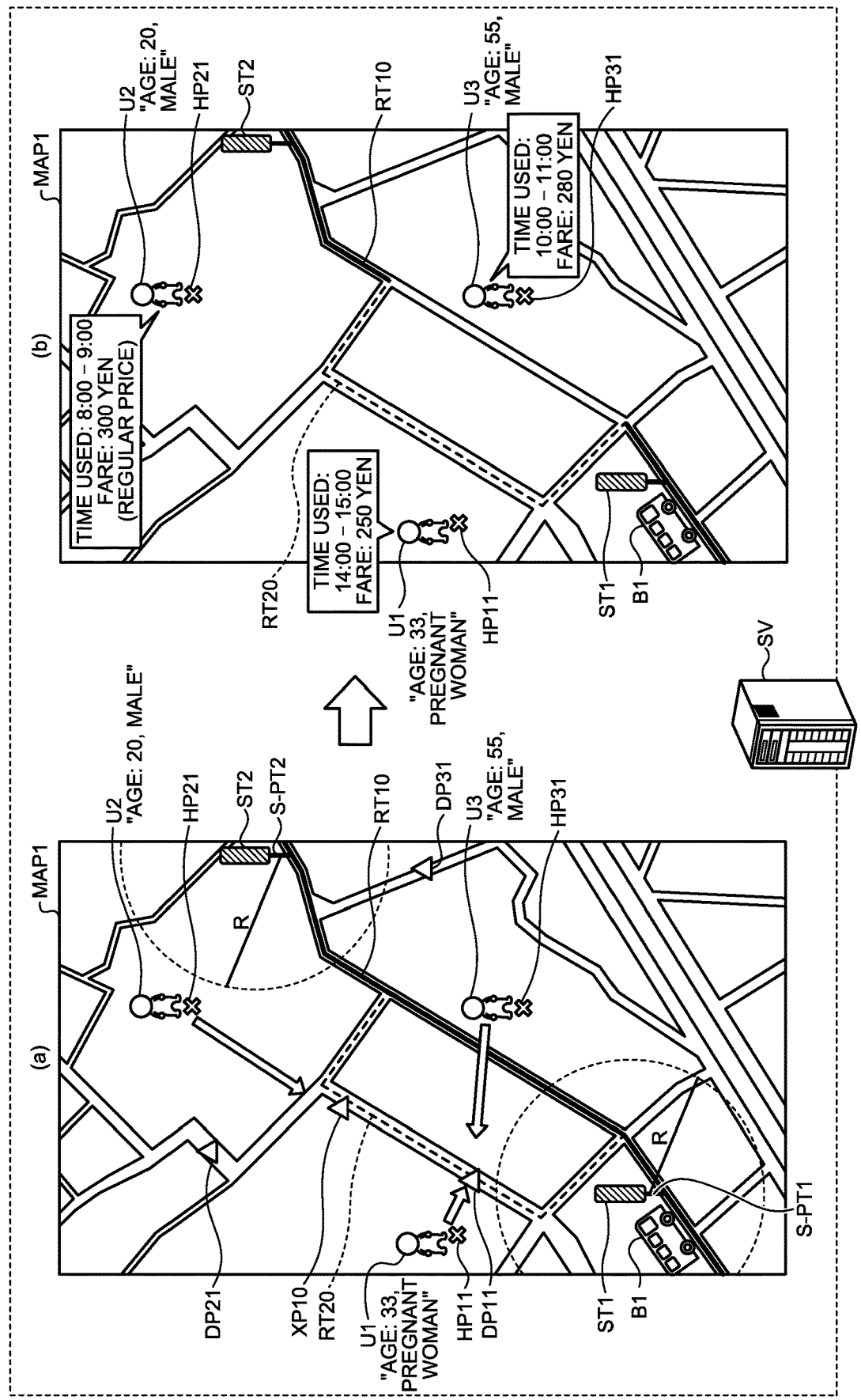
FIG. 1 is a diagram illustrating an example of information processing according to an embodiment.

A mode (hereinafter, referred to as an "embodiment") for carrying out an information processing apparatus, an information processing method, and an information processing program according to the present application will be described below with reference to the accompanying drawings. The information processing apparatus, the information processing method, and the information processing program according to the present application are not limited to the embodiments. Furthermore, in the embodiments below, the same components are denoted by the same reference numerals and overlapping descriptions will be omitted.

1. Outline of Information Processing

First, the outline of information processing according to an embodiment will be described with reference to FIG. 1. FIG. 1 is a diagram illustrating an example of information processing according to the embodiment. An information processing system according to the embodiment includes an information processing apparatus SV and a terminal device 10. Although not illustrated in the drawing, in the example illustrated in FIG. 1, each of users (users U1, U2, and U3) holds the terminal device 10. The information processing according to the embodiment is performed by the information processing apparatus SV illustrated in FIG. 1. For example, the information processing apparatus SV is an information processing apparatus that is implemented by a single or a plurality of devices, such as a server device or a cloud system, that can communicate with the terminal devices 10 used by the users via a network, such as a mobile communication network or a wireless local area network (LAN).

The information processing performed by the information processing apparatus SV will be described in detail later by using three embodiments, specifically, by using a first embodiment, a second embodiment, and a third embodiment.

The terminal devices 10 are information processing apparatuses used by users. The terminal devices 10 are, for example, smart phones, tablet terminals, notebook personal computers (PCs), desktop PCs, mobile phones, personal digital assistants (PDA), or the like. Furthermore, it is assumed that in each of the terminal devices 10, an application (hereinafter, referred to as a "riding guide application AP") that can be used to search an operation situation of a route bus and the position of individual bus stations of the route bus is previously installed.

The riding guide application AP acquires, in cooperation with the information processing apparatus SV according to the embodiment, various kinds of information related to the route buses from the information processing apparatus SV and shows the acquired information to a user. For example, the user can register the name of the usually used bus stations in the riding guide application AP as "favorite registration". In such a case, the riding guide application AP acquires, at an arbitrary timing, the information related to the bus station registered as "favorite registration" from the information processing apparatus SV and shows the information to the user.

Furthermore, it is assumed that the moving vehicle targeted by the information processing apparatus SV is an "on-demand bus". The on-demand bus is a type of a route bus and, if a user carries out a process by using a communication method, such as the Internet, the on-demand bus goes to pick up a user to, for example, a virtually placed bus station via, for example, a detour route that is not the basic route. Hereinafter, the bus station that is virtually placed in this way is referred to as a "virtual bus stop", in contrast to a physically placed bus station (hereinafter, sometimes referred to as an "existing bus stop") that is conventionally present in a basic route.

2. Outline of Information Processing Associated with the First Embodiment

The information processing apparatus SV places a virtual bus stop at an arbitrary position by taking into account the attribute information on a user, road information, traffic situation, and the like. For example, a user can designate a riding desired position (hereinafter, sometimes referred to as a "desired position") desired by the user to ride on an on-demand bus with respect to the information processing apparatus SV. However, if the virtual bus stops are placed by the information processing apparatus SV as desired by all of the users and if transportation in a detour route passing through all of the placed virtual bus stops is designated to the on-demand bus, for example, a delay occurs in the operation schedule of the subject on-demand bus.

Accordingly, in a predetermined area including the basic route determined for each of the on-demand buses, for example, the number of virtual bus stops to be placed in each predetermined area is limited. Consequently, the information processing apparatus SV calculates, from among the riding desired positions received from the individual users, a placement position by determining which riding desired positions is more fair for a virtual bus stop in terms of each of the users and then places the virtual bus stop at the riding desired position that is associated with the calculation result.

Furthermore, if a user having the attribute information (for example, expecting a baby or affected by a disease) indicating that, for example, a heavier burden may possibly be imposed at the time of moving is present from among users who designated their riding desired positions, even if inequality occurs in terms of the moving distance viewed from the other users, the information processing apparatus SV places the virtual bus stop at the position in which a burden of the user who has the attribute information indicating that a heavier burden may possibly be imposed at the time of moving can be reduced.

This point will be described with reference to the example illustrated in FIG. 1. First, in the area indicated by a MAP1 indicated by (a) illustrated in FIG. 1, it is assumed that an on-demand bus B1 runs in the basic route RT10. Furthermore, existing bus stops ST1 and ST2 are present in the basic route RT10. Furthermore, the position information on the position of the existing bus stop ST1 is "S-PT1" and the position information on the position of the existing bus stop ST2 is "S-PT2".

Furthermore, in the example of (a) in FIG. 1, a user U1 has the attribute information indicating "35 years old and a pregnant woman". Furthermore, in the example of (a) in FIG. 1, the user U1 designates a desired position "DP11". Furthermore, in the example of (a) in FIG. 1, the current position of the user U1 is a current position "HP11".

Furthermore, in the example of (a) in FIG. 1, a user U2 has the attribute information indicating "20 years old and a male". Furthermore, in the example of (a) in FIG. 1, the user U2 designates a desired position "DP21". Furthermore, in the example of (a) in FIG. 1, the current position of the user U2 is a current position "HP21".

Furthermore, in the example of (a) in FIG. 1, a user U3 has the attribute information indicating "55 years old and a male". Furthermore, in the example of (a) in FIG. 1, a user U3 designates a desired position "DP31". Furthermore, in the example of (a) in FIG. 1, the current position of the user U3 is a current position "HP31".

In this state described above, the information processing apparatus SV acquires the attribute information on the users and decides, based on the acquired attribute information, a placement position in which a virtual riding point that corresponds to a riding point that is used for a user to ride in a moving vehicle and that is virtually set is placed. For example, the information processing apparatus SV calculates, based on the moving distance of a user and based on the user attribute information, a moving cost that is a cost needed for the user to move along the moving distance. Then, the information processing apparatus SV decides the placement position based on the calculated moving cost. Furthermore, in the area indicated in the MAP1, it is assumed that only a "single piece" of virtual bus stop can be placed.

In the example of (a) in FIG. 1, it is conceivable that, because the user U1 is a pregnant woman, a physical burden imposed at the time of moving is heavier than that imposed on the users U2 and U3. For example, if one of the desired positions "DP21" and "DP31" is decided as the placement position in which a virtual bus stop is to be placed, the moving distance of the user U1 becomes long and thus the physical burden is increased. Accordingly, the information processing apparatus SV decides, from among the three desired positions, a desired position DP21 that is designated by the user U1 and that has the shortest moving distance for the user U1 when the user U1 moves from the current position HP11 as the placement position in which the virtual bus stop is to be placed.

If the desired position DP21 is decided as the placement position in which the virtual bus stop is to be placed, the moving distance becomes long for the users U2 and U3. Specifically, because the user U2 moves from the current position "HP21" to the desired position "DP11" that was designated by the user U1, instead of the desired position "DP21" that was designated by the user U2 by himself, the moving distance is increased. Similarly, because the user U3 moves from the current position "HP31" to the desired position "DP11" that was designated by the user U1, instead of the desired position "DP31" that was designated by the user U3 by himself, the moving distance is increased.

However, based on the attribute information on the users U2 and U3, because it is estimated that the physical burden is smaller than that of the user U1 at the time of moving, even if the moving distance is increased because the virtual bus stop is not placed at the original desired position, the desired position "DP11" is the most fair placement position when the attribute information and the moving distance for each of the users U1 to U3 are comprehensively judged.

Based on the above circumstances, if the information processing apparatus SV receives designation of riding desired positions from a plurality of users under the condition that the limitation is set to the placement position of the virtual bus stop, by considering the attribute information and the moving distance for each of the plurality of users, it is possible to place a virtual bus stop at a more fair position in terms of the plurality of users. Furthermore, because of this, the information processing apparatus SV can enhance the convenience of users who use moving vehicles (for example, an on-demand bus).

Furthermore, in the example of (a) in FIG. 1, if the desired position "DP11" is decided as the placement position, regarding the user U2, the moving distance from the current position "HP21" to the existing bus stop position "S-PT2" is shorter than the moving distance from the current position "HP21" to the desired position "DP11". In such a case, there is no point for the user U2 in showing a riding desired position. Accordingly, the information processing apparatus SV may also decide, as the placement position, the position in which the moving distance is shorter than the moving distance from each of the current positions of the users U1 to U3 to the existing bus stop in terms of each of the users U1 to U3 and the moving distance from the user U1 is the shortest. For example, the information processing apparatus SV may also decide a position "XP10" as a placement position.

3. Outline of the Information Processing According to a Second Embodiment

For example, if the placement position of the virtual bus stop is too close to the position of the existing bus stop, the significance of placing the virtual bus stop with such a positional relationship is low from the viewpoint of solving a problem by simply using the existing bus stop. Furthermore, if a plurality of placement positions are set, if the distance between each of the placement positions is too close, the significance of placing the virtual bus stop with such a positional relationship is low from the viewpoint of solving a problem by simply setting either of the placement positions.

Furthermore, if the virtual bus stop is placed in the positional relationship described in the above example, an on-demand bus needs to be frequently stopped and thus the operational efficiency is conceivably degraded. If the on-demand bus needs to be frequently stopped, the cost needed for the operation is conceivably increased. In order to avoid such situations, the information processing apparatus SV specifies a placement available position that is the position in which a virtual bus stop can be placed and then decides the placement position based on the specified placement available position.

For example, in the example of (a) in FIG. 1, it is assumed that a circular area with a radius R centered at a position "S-PT1" in which an existing bus stop ST1 is present is provided and it is previously determined that a virtual bus stop is not placed in the subject circular area. Furthermore, similarly, it is assumed that a circular area with the radius R centered at the position "S-PT2" in which the existing bus stop ST2 is present is provided and it is previously determined that a virtual bus stop is not placed in such a circular area.

Furthermore, although not illustrated, also regarding the virtual bus stop, it is assumed that a circular area with the radius R centered at the subject placement position, it is previously determined that another virtual bus stop is not placed and an existing bus stop is not present. Thus, the circular area with the radius R regarding each of the bus stops is the placement prohibited area in which no virtual bus stop is placed. In other words, the information processing apparatus SV can place a virtual bus stop in an area other than these placement prohibited areas.

Thus, the information processing apparatus SV specifies a placement available position that is the position in which a virtual riding point that corresponds to a riding point that is used to ride in a moving vehicle and that is virtually set can be placed and decides, based on the specified placement available position, a placement position in which the virtual riding point is to be placed. In the example illustrated in FIG. 1, the information processing apparatus SV sets the placement position based on the information designated by the users U1 to U3 and based on the attribute information as described above and, at this time, the information processing apparatus SV specifies, as the placement available position, the area other than both the circular area with the radius R centered at the position "S-PT1" in which the existing bus stop ST1 is present and the circular area with the radius R centered at the position "S-PT2" in which the existing bus stop ST2 is present. Then, the information processing apparatus SV decides the placement position at the specified placement available position and places the virtual bus stop at the decided placement position.

Consequently, because the information processing apparatus SV does not place a virtual bus stop at the position, for example, that is too close to the position of an existing bus stop, the information processing apparatus SV can efficiently suppress a decrease in the operational efficiency of a moving vehicle (for example, an on-demand bus) and an increase in a cost needed for the operation of the moving vehicle.

4. Outline of Information Processing Associated with the Third Embodiment

For example, if on-demand buses are operated in accordance with an operation schedule, there may be a case in which a time zone in which a lot of users are present (for example, the commuting rush hour time zone) or a time zone in which few users are present is generated. Because the on-demand buses are operated in accordance with the operation schedule, in an extreme example, an on-demand bus needs to be operated even if the number of users is "0". If an on-demand bus is operated even if no user is present, only the operation cost is consequently increased. Based on this, an operation company desires that the on-demand buses are constantly used in any time zone. Thus, the information processing apparatus SV provides various incentives to users in order to encourage a users' willingness to use the on-demand buses.

Specifically, the information processing apparatus SV acquires a usage situation of a user who has used the moving vehicle and provides a predetermined incentive to the user in accordance with the acquired usage situation. For example, the information processing apparatus SV determines, based on the acquired usage situation, whether the user has used the moving vehicle in the predetermined time zone or at a predetermined location. Then, the information processing apparatus SV provides the predetermined incentive to the user in accordance with the determination result. This point will be described with reference to the example indicated by (b) illustrated in FIG. 1.

In the example of (b) in FIG. 1, it is assumed that a placement position is decided based on the information designated by the users U1 to U3 and the attribute information on the users U1 to U3 and it is assumed that an on-demand bus B1 has been used for a ride at the decided placement position. The information processing apparatus SV can acquire the usage situation of the on-demand bus B1 via, for example, various sensors provided inside the on-demand bus B1. For example, the information processing apparatus SV can acquire the usage situation such as information indicating when and from where a user rode in an on-demand bus running which of the target destinations (destination) as the basic route.

In the example of (b) in FIG. 1, the information processing apparatus SV indicates an example in which the user U1 used the on-demand bus B1 running between "14:00 and 15:00". Here, if it is found that a usage amount (the number of users) of the on-demand bus B1 used between "14:00 and 15:00" is smaller than the average usage amount of the on-demand bus B1 per day, an information processing apparatus 100 provides an incentive to the user U1 in response to the fact that the user U1 used the on-demand bus B1 between "14:00 and 15:00" for which the usage amount is low. For example, the information processing apparatus 100 sets the fare (250 yen) lower than the fare (set to 300 yen) that is originally to be paid by the user U1.

Furthermore, if it is found that a usage amount (the number of users) of the on-demand bus B1 used between "10:00 and 11:00" is smaller than the average usage amount of the on-demand bus B1 per day, the information processing apparatus 100 provides an incentive to the user U3 in response to the fact that the user U3 used the on-demand bus B1 between "10:00 and 11:00". For example, the information processing apparatus 100 sets the fare (280 yen) lower than the fare (set to 300 yen) that is originally to be paid by the user U3.

In contrast, the information processing apparatus 100 does not provide an incentive to the user U2 who used the on-demand bus B1 used between "8:00 and 9:00" for which the usage amount (the number of users) of the on-demand bus B1 used is greater than the average usage amount of the on-demand bus B1 per day due to the commuting rush hour.

Consequently, the information processing apparatus SV can provide, to a user, a motivation to use the on-demand bus B1 in such an attractive time zone in which the fare becomes lower, thereby equalizing the usage situation in which the on-demand bus B1 is used.

First Embodiment

1. Example of Information Processing

Figure 2:
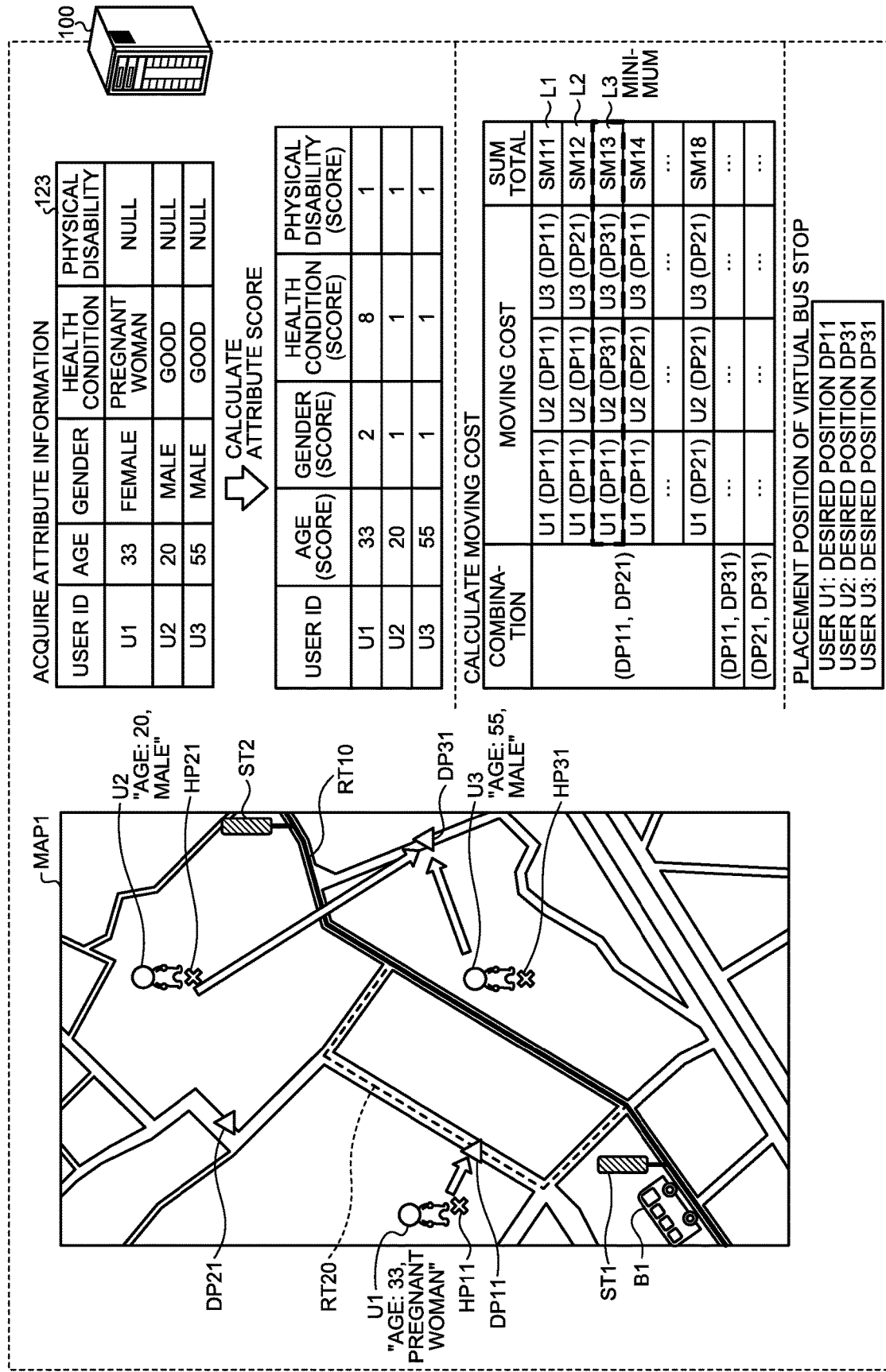
FIG. 2 is a diagram illustrating an example of information processing according to a first embodiment.

In the following, an example of the information processing according to the first embodiment will be described with reference to FIG. 2. FIG. 2 is a diagram illustrating an example of the information processing according to the first embodiment. The information processing system according to the first embodiment includes the information processing apparatus 100 and the terminal devices 10. Although not illustrated in the drawing, in the example illustrated in FIG. 2, each of the users (the users U1, U2, and U3) has the terminal device 10. The information processing according to the first embodiment is performed by the information processing apparatus 100 illustrated in FIG. 2. The information processing apparatus 100 is an example of the information processing apparatus SV described with reference to FIG. 1. For example, the information processing apparatus 100 is an information processing apparatus that is implemented by a single or a plurality of devices, such as a server device or a cloud system, that can communicate with the terminal devices 10 used by the users via a network, such as a mobile communication network or a wireless local area network (LAN).

The information processing apparatus 100 can accept a riding reservation for an on-demand bus from a user via the "riding guide application AP". For example, the information processing apparatus 100 can accept a riding reservation for an on-demand bus on the date of the current and the subsequent date. For example, the information processing apparatus 100 can accept, as the riding reservation for the on-demand bus, the designation of the riding desired position indicating the position that is desired by a user to ride on the on-demand bus. For example, by showing candidate positions that are the candidates for the placement positions that can be placed for the virtual bus stop to a user, the information processing apparatus 100 can accept the selected position from among the candidate positions as the riding desired position.

Furthermore, the information processing apparatus 100 can acquire an "immediate call" for the on-demand bus from the user via the "riding guide application AP". The "immediate call" is a process that can be urgently responded when compared with the riding reservation and the "immediate call" can be restated as an allocation instruction of a moving vehicle dispatched to the current position of the user. For example, the user can request an "immediate call", such as "a request for an allocation of an on-demand bus around the current position (for example, own house) within 15 minutes from the current time".

In the first embodiment below, the information processing performed in a case where a designation of a riding desired position is accepted from a user as a riding reservation will be described, the content of the processing is the same when the immediate call is performed.

Specifically, the information processing apparatus 100 acquires the attribute information on a user and decides, based on the acquired attribute information, the placement position in which a virtual riding point that corresponds to a riding point that is used for a user to ride in a moving vehicle and that is virtually set is placed. For example, the information processing apparatus 100 further decides the placement position based on the position information on the user. The position information mentioned here is the information (desired riding position information) indicating the riding desired position that was designated at the time of riding reservation or the information (current position information) indicating the current position designated at the time of immediate call. Furthermore, because the current position designated at the time of immediate call is also the position desired by a user for a ride, the current position information at the time of immediate call can be restated as desired riding position information.

Furthermore, for example, based on the attribute information and the moving distance of the user to the position indicated by the position information, the information processing apparatus 100 calculates a moving cost that is the cost needed for a user to move the moving distance. Then, the information processing apparatus 100 decides the placement position based on the calculated moving cost. This point will be described with reference to the example illustrated in FIG. 2. Furthermore, in the example illustrated in FIG. 2, it is assumed that, in the area indicated by the MAP1, it is previously determined that the maximum of "two" virtual bus stops can be placed.

Similarly to the example of (a) illustrated in FIG. 1, in FIG. 2, the user U1 designates the desired position "DP11". Furthermore, in also the example illustrated in FIG. 2, the current position of the user U1 is the current position "HP11".

Furthermore, similarly to the example of (a) illustrated in FIG. 1, in FIG. 2, the user U2 designates the desired position "DP21". Furthermore, in also the example illustrated in FIG. 2, the current position of the user U2 is the current position "HP21".

Similarly to the example of (a) illustrated in FIG. 1, in FIG. 2, the user U3 designates the desired position "DP31". Furthermore, in also the example illustrated in FIG. 2, the current position of the user U3 is the current position "HP31".

For example, the information processing apparatus 100 acquires, as the attribute information on a user, age information on the user, gender information, information related to a health condition, information related to a physical disability, and information related to presence or absence of an infant. Furthermore, the information acquired as the attribute information is not limited to this. FIG. 2 indicates an example in which the information processing apparatus 100 has acquired, for example, as the attribute information on the user U1, the age of "33", the gender of "female", the health condition of "pregnant woman", and the physical disability of "null". Furthermore, FIG. 2 indicates an example in which the information processing apparatus 100 has acquired, for example, as the attribute information on the user U2, the age of "20", the gender of "male", the health condition of "good", and the physical disability of "null". Furthermore, FIG. 2 indicates an example in which the information processing apparatus 100 has acquired, for example, as the attribute information on the user U3, the age of "55", the gender of "male", the health condition of "good", and the physical disability of "null".

Then, the information processing apparatus 100 calculates, for each pieces of the attribute information on the users, an attribute score that is the score indicating the attribute information. A method of calculating the attribute score is not limited. For example, the information processing apparatus 100 calculates a high score as the attribute information possibly indicates a heavier burden at the time of moving. For example, the information processing apparatus 100 can calculate the age information ("33" in a case of the user U1) as the attribute score "33" without changing anything. Furthermore, regarding the attribute information indicated by "female", the information processing apparatus 100 can calculate the attribute score of "2" that is higher than the attribute score of "1" associated with the attribute information indicated by "male".

Furthermore, the information processing apparatus 100 can calculate a higher attribute score as the attribute information indicates that a health condition is conceivably worse. For example, when calculating the maximum value of "10" with respect to the attribute information indicating that a health condition is conceivably the worst, the information processing apparatus 100 can calculate the attribute score of "8" that is associated with, for example, the attribute information of "pregnant woman". Furthermore, regarding the attribute information of "physical disability", the information processing apparatus 100 can calculate a higher attribute score as the physical disability is more severe.

Then, the information processing apparatus 100 calculates a moving cost. The moving cost is a cost needed for a user to move the corresponding moving distance and can also be stated as the information that indicates the level of a physical burden imposed on a user at the time of moving the associated moving distance.

Here, in the example illustrated in FIG. 2, three desired positions, i.e., a desired position DP11 designated by the user U1, the desired position DP21 designated by the user U2, and a desired position DP31 designated by the user U3, are present. As described above, because the information processing apparatus 100 can place the maximum of "two" virtual bus stops, the information processing apparatus 100 decides, from among the three desired positions, which of the two desired positions are set as the placement positions. In the example illustrated in FIG. 2, the information processing apparatus 100 calculates a moving cost of each of the users for each combination of the possible desired positions and calculates the sum total of each of the calculated moving costs. Then, from among the sum totals of the moving costs calculated for corresponding combinations of the desired positions, the information processing apparatus 100 decides the position with the smallest sum total as the placement position.

Furthermore, an example of a method of calculating a moving cost for each combination of the desired positions will be described later. The example illustrated in FIG. 2 indicates a case in which the information processing apparatus 100 decides, regarding the user U1, the desired position DP11 designated by the user U1 as the placement position (first placement position). Furthermore, the example illustrated in FIG. 2 indicates a case in which the information processing apparatus 100 decides, regarding the users U2 and U3, the desired position DP21 designated by the user U2 as the placement position (second placement position).

Furthermore, although not illustrated, the information processing apparatus 100 shows information indicating that a virtual bus stop is placed at the desired position DP11 and shows guide information for guiding the route to the virtual bus stop to the user U1. Similarly, the information processing apparatus 100 shows information indicating that a virtual bus stop is placed at the desired position DP21 and shows guide information for guiding the route to the virtual bus stop to the users U2 and U3.

Consequently, the information processing apparatus 100 according to the first embodiment can place a virtual bus stop at fair positions in terms of a plurality of users. Furthermore, the information processing apparatus 100 according to the first embodiment can enhance the convenience of users who use moving vehicles.

2. Configuration of the Information Processing Apparatus

Figure 3:
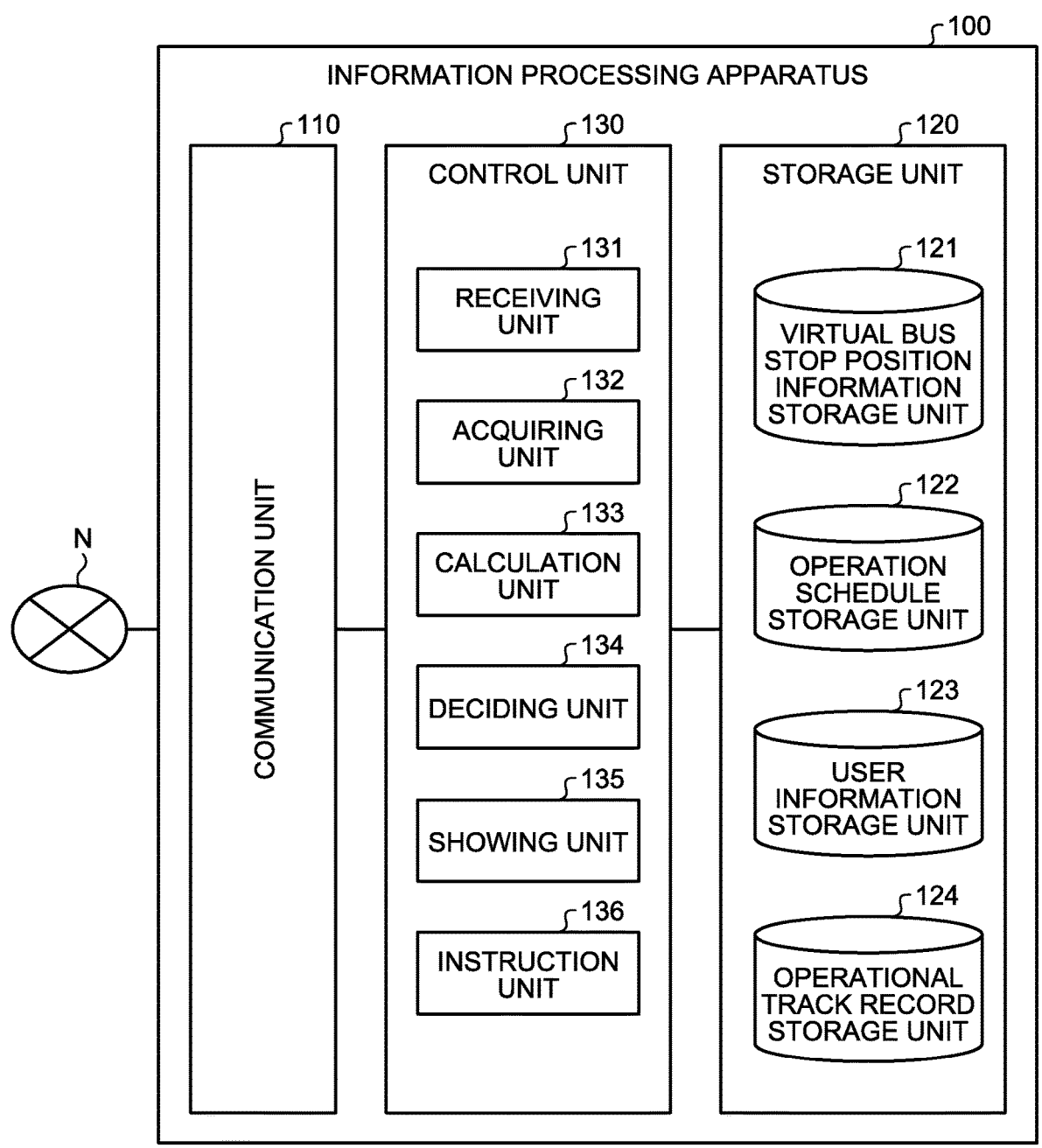
FIG. 3 is a diagram illustrating a configuration example of an information processing apparatus according to the first embodiment.

In the following, the information processing apparatus 100 according to the first embodiment will be described with reference to FIG. 3. FIG. 3 is a diagram illustrating a configuration example of the information processing apparatus 100 according to the first embodiment. As illustrated in FIG. 3, the information processing apparatus 100 includes a communication unit 110, a storage unit 120, and a control unit 130.

Communication Unit 110

The communication unit 110 is implemented by, for example, a network interface card (NIC), or the like. Furthermore, the communication unit 110 is connected to the network N in a wired or wireless manner and sends and receives information to and from, for example, the terminal devices 10.

Storage Unit 120 The storage unit 120 is implemented by, for example, a semiconductor memory device, such as a Random Access Memory (RAM), or a flash memory, or a storage device, such as a hard disk or an optical disk. The storage unit 120 includes a virtual bus stop position information storage unit 121, an operation schedule storage unit 122, a user information storage unit 123, and an operational track record storage unit 124.

Virtual Bus Stop Position Information Storage Unit 121

The virtual bus stop position information storage unit 121 is the storage unit that stores therein candidates for the positions of the virtual bus stops to be placed. Here, FIG. 4 illustrates an example of the virtual bus stop position information storage unit 121 according to the first embodiment. In the example illustrated in FIG. 4, the virtual bus stop position information storage unit 121 has items, such as "prefectures", "company", "path ID", "position information (coordinates)", and the like.

The "company" indicates the name of the route bus operation company that is present in the associated "prefectures". The "path ID" is identification information indicating the route in which the route bus operated by the associated "company" runs. The "position information (coordinates)" indicates position information that indicates the position in which a virtual bus stop can be placed and that indicates a candidate for the position in which the virtual bus stop is placed.

Namely, the example illustrated in FIG. 4 indicates a case in which, from among the routes in which route buses (on-demand buses) operated by the route bus operation company "TK traffic, Inc." that is present in the prefecture "Tokyo", a virtual bus stop can be placed at the positions "X1 and Y1" in the route (20 path route) identified by the path ID "20".

Operation Schedule Storage Unit 122

The operation schedule storage unit 122 is a storage unit that stores therein an operation schedule for each on-demand bus. Here, FIG. 5 illustrates an example of the operation schedule storage unit 122 according to the first embodiment. In the example illustrated in FIG. 5, the operation schedule storage unit 122 has items, such as "company name", "path ID", "schedule information", and the like.

The "company name" and the "path ID" have been explained with reference to FIG. 4; therefore, explanation thereof will be omitted. The "schedule information" indicates an operation schedule of an on-demand bus. In the example illustrated in FIG. 5, a concept symbol (for example, "DA20") is used as the "schedule information"; however, in practice, for example, the departure time, the target destination, the arrival time at the target destination, map information indicating the basic route, and the like are stored.

Namely, the example illustrated in FIG. 5 indicates a case in which the route buses (on-demand buses) operated by the route bus operation company "TK traffic, Inc." that is present in the prefecture "Tokyo" are operated by the schedule indicated by schedule information "DA20".

User Information Storage Unit 123

The user information storage unit 123 is a storage unit that stores therein various kinds of information (for example, attribute information) related to users. Here, FIG. 6 illustrates an example of the user information storage unit 123 according to the first embodiment. In the example illustrated in FIG. 6, the user information storage unit 123 has items, such as "user ID", "age", "gender", "health condition", "physical disability", "infant information", and the like.

The "user ID" indicates identification information for identifying a user or the terminal device 10 of the user. The "age" indicates the age of a user. The "gender" indicates the gender of a user. The "health condition" indicates information related to the health condition of a user (be pregnant or the like). The "physical disability" indicates information related to a physical disability of a user. For example, the "physical disability" indicates whether a user has a physical disability and indicates, if so, what kind of physical disability the user has. The "infant information" is information related to presence or absence of an infant or information whether or not to accompany an infant.

Namely, the example illustrated in FIG. 6 indicates a case in which, the attribute information on the user U1 indicates the age of "33", the gender of "female", the health condition of "pregnant woman", the physical disability of "null", and the infant information of "accompanying an elementary school student". Furthermore, although not illustrated, the information processing apparatus 100 may also further include a storage unit that stores therein information that is used to calculate an attribute score that corresponds to information (value) indicating the attribute information. For example, by referring to this storage unit, the information processing apparatus 100 can determine whether what kind of attribute score is needed to calculate for the health condition of "pregnant woman".

Operational Track Record Storage Unit 124

The operational track record storage unit 124 is a storage unit that stores therein information related to the operational track record of a route bus. Here, FIG. 7 illustrates an example of the operational track record storage unit 124 according to the first embodiment. In the example illustrated in FIG. 7, the operational track record storage unit 124 has the items, such as "company", "path ID", "date and time information", "delay information", and the like.

The "company" indicates the name of a route bus operation company. The "path ID" is identification information indicating the route in which a route bus (on-demand bus) operated by the associated "company" runs. The "date and time information" indicates the date and time on which a route bus runs in the section indicated by "delay information". The "delay information" indicates the section in which a delay occurs in the operation schedule in the route identified by the "path ID". For example, in the section in which bus stations with a large number of persons getting on or off are continuously present, a delay tends to occur in the operation schedule.

Namely, the example illustrated in FIG. 7 indicates a case in which, in the route (20 path route) identified by the path ID "20", in the period of time indicated by the date and time information "8:15 to 8:30, Sep. 5, 2017", a delay occurs in the operation schedule in a section X1.

Furthermore, the operational track record storage unit 124 may also store, in an associated manner, the date and time information that indicates the date and time on which congestion occurred and congestion information that indicates the section in which the congestion occurred.

Control Unit 130

A description will be given here by referring back to FIG. 3. The control unit 130 is implemented by a central processing unit (CPU), a micro processing unit (MPU), or the like, executing various kinds of programs, which are stored in a storage device in the information processing apparatus 100, by using a RAM as a work area. Furthermore, the control unit 130 is implemented by, for example, an integrated circuit, such as an application specific integrated circuit (ASIC), a field programmable gate array (FPGA), or the like.

As illustrated in FIG. 3, the control unit 130 includes a receiving unit 131, an acquiring unit 132, a calculation unit 133, a deciding unit 134, a showing unit 135, an instruction unit 136 and implements or executes the function or the operation of the information processing described below. Furthermore, the internal configuration of the control unit 130 is not limited to the configuration illustrated in FIG. 3 and another configuration may also be used as long as the configuration in which the information processing described below is performed is used. Furthermore, the connection relation between each of the processing units included in the control unit 130 is not limited to the connection relation illustrated in FIG. 3 and another connection relation may also be used.

Receiving Unit 131

The receiving unit 131 receives various kinds of information from the terminal devices 10. For example, the receiving unit 131 receives a distribution request for content or information related to the content.

Furthermore, the receiving unit 131 accepts various kinds of designation information that is used to designate a moving vehicle from the terminal device 10. For example, the receiving unit 131 receives position information related to a user. For example, the receiving unit 131 receives information related to a riding reservation for an on-demand bus. As an example, the receiving unit 131 accepts, as information related to the riding reservation for the on-demand bus, designation of the riding desired position indicating the position desired for a ride on the on-demand bus.

Furthermore, for example, the receiving unit 131 receives information related to an immediate call for an on-demand bus. As an example, the receiving unit 131 accepts, from a user, an allocation instruction of a moving vehicle to the current position (or, the position around the current position) of the user.

Acquiring Unit 132

The acquiring unit 132 acquires the attribute information on a user. For example, the acquiring unit 132 acquires the attribute information on the user from a cooperating external information processing apparatuses (various server devices). For example, the acquiring unit 132 acquires the attribute information on a user from a content server that distributes content (article content, advertisement content, etc.). Furthermore, the acquiring unit 132 acquires the attribute information on a user from a shopping server that manages the transaction of a product. Furthermore, the acquiring unit 132 acquires the attribute information on a user from an application server that manages various applications. Furthermore, the acquiring unit 132 stores the acquired attribute information in the user information storage unit 123.

Furthermore, the acquiring unit 132 may also acquire the positional relationship between the riding position information that indicates a riding point for a ride in a moving vehicle and the user position information that indicates the current position of the user. Furthermore, the acquiring unit 132 may also acquire the moving vehicle position information that indicates the current position of the moving vehicle. Furthermore, the acquiring unit 132 can also calculate, based on the acquired information, information to be shown to the user. For example, the acquiring unit 132 can calculate the remaining time needed for the on-demand bus B1 to arrive at each of the existing bus stops ST1 and ST2. Furthermore, the acquiring unit 132 can calculate the remaining time needed for the on-demand bus B1 to arrive at each of the virtual bus stops that are placed by the deciding unit 134. Furthermore, the calculation process described above may also be performed in a processing unit other than the acquiring unit 132.

Calculation Unit 133

The calculation unit 133 calculates, based on the moving distance of a user to the position indicated by the position information and based on the attribute information on the user, a moving cost that is the cost needed for the user to move the subject moving distance. The moving cost is the cost needed for the user to move the associated moving distance and can also be stated as the information that indicates the level of a physical burden imposed on the user at the time of travelling the associated moving distance. Furthermore, the position information mentioned here is, for example, desired riding position information that indicates the riding desired position designated by the user at the time of a riding reservation or an immediate call.

For example, the calculation unit 133 calculates a moving cost by multiplying the moving distance of the user to the position indicated by the position information by the attribute score that indicates the attribute information on the user. Furthermore, the calculation unit 133 may also calculate an attribute score.

Deciding Unit 134

The deciding unit 134 decides, based on the attribute information acquired by the acquiring unit 132, the placement position in which the virtual riding point that corresponds to a riding point that is used by a user to ride in a moving vehicle and that is virtually set is placed. For example, the deciding unit 134 decides the placement position based on the position information related to the user.

Furthermore, for example, when a riding reservation for the moving vehicle made by the user is accepted, the deciding unit 134 decides the placement position based on, as the position information, the desired riding position information that indicates the position in which a ride in a moving vehicle is desired and that is designated at the time of the riding reservation made by the user. Furthermore, when an allocation instruction (immediate call) of a moving vehicle to the current position of the user made by the user is accepted, the deciding unit 134 decides the placement position based on, as the position information, the current position information indicating the subject current position.

Furthermore, the deciding unit 134 decides the placement position based on the moving cost calculated by the calculation unit 133. Specifically, the deciding unit 134 decides the placement position such that the sum total of the moving costs of the plurality of users becomes the minimum. For example, the deciding unit 134 decides, as the placement position from among the positions indicated by the position information, the position in which the sum total of the moving costs of the plurality of users becomes the minimum. Furthermore, the deciding unit 134 decides, based on the moving costs calculated by the calculation unit 133, the placement positions corresponding to the number of placement positions that is previously determined.

Furthermore, the deciding unit 134 actually places the virtual bus stops at the placement positions that are decided as described above.

Showing Unit 135

The showing unit 135 shows content to a user. Specifically, the showing unit 135 shows the content related to a virtual bus stop placed by the deciding unit 134 to a user. For example, the showing unit 135 shows guide information that guides the route to the virtual bus stop placed by the deciding unit 134. As an example, the showing unit 135 shows the map information in which the route from the current position of the user to the virtual bus stop is displayed as the guide information. Furthermore, unlike the existing bus stop, because the virtual bus stop is not physically present, a user may sometimes have difficulty in recognizing the accurate position. Thus, the showing unit 135 may also show surrounding information (for example, a photograph) on the surrounding area of the virtual bus stop.

Instruction Unit 136

The instruction unit 136 instructs the moving vehicle to move to the virtual bus stop placed by the deciding unit 134. For example, the instruction unit 136 decides a detour route to the virtual bus stop based on the original running route of the moving vehicle and instructs the moving vehicle to run the decided detour route.

3. Example of the Operation In Information Processing

In the following, the content of the process executed and implemented by each of the processing units 131 to 136 will be described by using the flowchart illustrated in FIG. 8. FIG. 8 is a flowchart illustrating an example of the information processing according to the first embodiment. Furthermore, the example illustrated in FIG. 2 is appropriately used.

First, the receiving unit 131 determines whether designation of the position information has been accepted from the user (Step S101). For example, the receiving unit 131 determines, as the position information, whether the position information indicating the riding desired position designated by the riding reservation, i.e., the desired riding position information, has been received. Furthermore, the receiving unit 131 may also determine, as the position information, the position information indicating the riding desired position designated by the immediate call, i.e., the desired riding position information, has been received.

If the receiving unit 131 has not received the desired riding position information (No Step S101), the receiving unit 131 waits until the receiving unit 131 receives the information. In contrast, if the receiving unit 131 has received the desired riding position information (Yes at Step S101), the receiving unit 131 moves the process to the acquiring unit 132.

Here, as illustrated in FIG. 2, it is assumed that the receiving unit 131 has accepted the designation of the desired position "DP11" from the user U1. Furthermore, it is assumed that the receiving unit 131 has received the information indicating that the current position of the user U1 is the current position "HP11" from the terminal device 10 of the user U1. Furthermore, as illustrated in FIG. 2, it is assumed that the receiving unit 131 has accepted the designation of the desired position "DP21" from the user U2. Furthermore, it is assumed that the receiving unit 131 has received the information indicating that the current position of the user U2 is the current position "HP21" from the terminal device 10 of the user U2. Furthermore, as illustrated in FIG. 2, it is assumed that the receiving unit 131 has accepted the designation of the desired position "DP31" from the user U3. Furthermore, it is assumed that the receiving unit 131 has received the information indicating that the current position of the user U3 is the current position "HP31" from the terminal device 10 of the user U3.

If the desired riding position information is received by the receiving unit 131 (Yes Step S101), the acquiring unit 132 acquires the attribute information on the user (Step S102). If the attribute information on the users U1 to U3 has already been stored in the user information storage unit 123, the acquiring unit 132 acquires the subject attribute information from the user information storage unit 123. In contrast, if the attribute information on the users U1 to U3 has not been stored in the user information storage unit 123, the acquiring unit 132 may also acquire the attribute information from, for example, a predetermined external device.

The example illustrated in FIG. 2 indicates the example in which the acquiring unit 132 has acquired the attribute information on the user U1 indicating the age "33", the gender "female", the health condition "pregnant woman", and the physical disability "null". Furthermore, FIG. 2 indicates the example in which the acquiring unit 132 has acquired the attribute information on, for example, the user U2 indicating the age "20", the gender "male", the health condition "good", and the physical disability "null". Furthermore, FIG. 2 indicates the example in which the acquiring unit 132 has acquired the attribute information on, for example, the user U3 indicating the age "55", the gender "male", the health condition "good", and the physical disability "null".

Then, the acquiring unit 132 acquires the position information on the existing bus stop (Step S103). In the example illustrated in FIG. 2, the acquiring unit 132 acquires the position information "S-PT1" indicating the position of the existing bus stop ST1 and acquires the position information "S-PT2" indicating the position of the existing bus stop ST2.

Then, the calculation unit 133 calculates an attribute score indicating attribute information for each of the pieces of attribute information on the individual users acquired by the acquiring unit 132 (Step S104). A method of calculating the attribute score performed by the calculation unit 133 is not limited; however, as an example, the calculation unit 133 calculates a higher score as the attribute information may possibly indicate that a heavier burden is imposed on a user at the time of moving. For example, the calculation unit 133 can calculate the age information ("33" in the case of the user U1) as the attribute score "33" without processing anything. Furthermore, regarding the attribute information "female", the calculation unit 133 can calculate the attribute score "2" that is higher than the attribute score "1" that is associated with the attribute information "male".

Furthermore, the calculation unit 133 can calculate a higher attribute score as the attribute information on the health condition is conceivably worse. For example, in the case where the maximum value "10" is calculated for the attribute information on the health condition that is conceivably worse, the calculation unit 133 can calculate the attribute score "8" associated with, for example, the attribute information "pregnant woman". Furthermore, regarding the attribute information "physical disability", the calculation unit 133 can calculate a higher attribute score as the physical disability is more severe.

The example illustrated in FIG. 2 indicates a case in which the calculation unit 133 calculates, regarding each of the pieces of attribute information on the user U1, the attribute score "33" with respect to the age "33", the attribute score "2" with respect to the gender "female", attribute score "8" with respect to the health condition "pregnant woman", and the attribute score "1" with respect to the physical disability "null". Descriptions of the users U2 and U3 will be omitted.

Then, the calculation unit 133 calculates a moving cost based on the moving distance of the user to each of the desired positions and based on the attribute score (Step S105). Furthermore, in this example, it is assumed that the information processing apparatus 100 may place the maximum of "two" virtual bus stops in the area indicated in the MAP1. Thus, the deciding unit 134, which will be described later, decides which of the two desired positions as the placement position from among the three desired positions.

In the example illustrated in FIG. 2, the calculation unit 133 calculates a moving cost of each of the users for each combination of the possible desired positions and calculates the sum total of the calculated moving costs. As illustrated in FIG. 2, in the case where three desired positions, such as the desired position "DP11", the desired position "DP21", and the desired position "DP31", are present and two out of three desired positions can be decided as the placement positions, the calculation unit 133 calculates a moving cost of each of the users for each combination obtained by combining the two desired positions from among the three desired positions and then calculates the sum total of the calculated moving costs.

As the combination of the desired positions, three combinations, such as the combination (DP11, DP21), the combination (DP11, DP31), and the combination (DP21, DP31), can be conceived. In the following, a description will be given by using the combination (DP11, DP21) as an example. For example, in the example of the desired positions DP11 and DP21, regarding each of the users U1 to U3, there is a possibility that the virtual bus stop between the desired positions DP11 and DP21 associated with one of the users. There are two candidates for the placement position for each of the users U1 to U3. Thus, the calculation unit 133 can calculate 18 moving costs regarding the combination (DP11, DP21).

An example of one of the 18 moving costs is a case in which the desired position DP11 becomes the placement position for the user U1, the desired position DP11 becomes the placement position for the user U2, and the desired position DP11 becomes the placement position for the user U3. This corresponds to L1 illustrated in FIG. 2 and, in such a case, the calculation unit 133 calculates the moving cost "U1 (DP11)" needed for the user U1 to move to the desired position DP11, the moving cost "U2 (DP11)" needed for the user U2 to move to the desired position DP11, and the moving cost "U3(DP11)" needed for the user U3 to move to the desired position DP11 and then calculates the sum total "SM11" of the moving cost obtained by summing the calculated three moving costs. Here, the calculation unit 133 can calculate the moving cost "U1 (DP11)" needed for the user U1 to move to the desired position DP11 by multiplying a moving distance K1 of the user U1 to move from the current position HP11 to the desired position DP11 by each of the attribute scores (33, 2, 8, and 1) of the user U1. Namely, K1×33×2×8×1=U1 (DP11) holds.

Furthermore, there is a case in which the desired position DP11 becomes the placement position for the user U1, the desired position DP11 becomes the placement position for the user U2, and the desired position DP21 becomes the placement position for the user U3. This corresponds to L2 illustrated in FIG. 2 and, in such a case, the calculation unit 133 calculates the moving cost "U1 (DP11)" needed for the user U1 to move to the desired position DP11, the moving cost "U2 (DP11)" needed for the user U2 to move to the desired position DP11, and the moving cost "U3 (DP21)" needed for the user U3 to move to the desired position DP21 and then calculates the sum total "SM12" of the moving costs that are obtained by summing the calculated three moving costs.

Furthermore, there is a case in which the desired position DP11 becomes the placement position for the user U1, the desired position DP31 becomes the placement position for the user U2, and the desired position DP31 becomes the placement position for the user U3. This corresponds to L3 illustrated in FIG. 2 and, in such a case, the calculation unit 133 calculates the moving cost "U1 (DP11)" needed for the user U1 to move to the desired position DP11, the moving cost "U2 (DP31)" needed for the user U2 to move to the desired position DP21, and the moving cost "U3 (DP31)" needed for the user U3 to move to the desired position DP21 and then calculates the sum total "SM13" of the moving cost obtained by summing the calculated three moving costs.

By using the same method, the calculation unit 133 calculates the sum total of the moving cost for each combination of the desired positions. Then, the deciding unit 134 decides, as the placement position, the position in which the sum total of the moving cost calculated by the calculation unit 133 is the minimum (Step S106). For example, in the example illustrated in FIG. 2, it is assumed that, from among all of the calculated sum totals, the sum total of the moving cost associated with the L3 is the minimum. In such a case, regarding the user U1, the deciding unit 134 decides the desired position DP11 designated by the user U1 as the placement position. Furthermore, regarding the users U2 and U3, the deciding unit 134 decides the desired position DP31 designated by the user U2 as the placement position. Furthermore, by deciding the two placement positions, i.e., the desired positions DP11 and DP21, the deciding unit 134 actually places the virtual bus stops at these placement positions.

Then, the showing unit 135 shows the guide information related to the virtual bus stops placed by the deciding unit 134 to the users (Step S107). Furthermore, in the example illustrated in FIG. 2, the instruction unit 136 instructs the on-demand bus B1 to run the detour route RT20 that passes through the desired positions DP11 and DP21 in each of which the virtual bus stop has been placed (Step S108).

4. Modification

The information processing apparatus 100 according to the first embodiment described above may also be performed with various kinds of embodiments other than the embodiment described above. Therefore, another embodiment of the information processing apparatus 100 described above will be described below.

4-1. Position Decision Considering Waiting Time

The deciding unit 134 decides, if a virtual riding point is placed, the placement position in which the virtual riding point is placed is decided based on the predicted waiting time of the user at the placement position in which the subject virtual riding point is to be placed. For example, in the example illustrated in FIG. 2, it is assumed that the weather at the time when designation of the desired points of the users U1 to U3 was accepted is a bad weather condition (for example, rain, snow, strong wind, high temperature, or low temperature). In such a weather condition, the calculation unit 133 estimates and calculates the waiting time in the case where the virtual bus stop is placed at each of the desired positions DP11, DP21, and DP31.

For example, based on the current position of the on-demand bus B1, the operation speed of the on-demand bus B1, based on the distance from the current position of the on-demand bus B1 to each of the desired positions DP11, DP21, and DP31, and based on the distance from the current position of each of the users to the individual desired positions DP11, DP21, and DP31, the calculation unit 133 estimates and calculates the waiting time in the case where a virtual bus stop is placed at each of the desired positions DP11, DP21, and DP31.

In this state, the deciding unit 134 decides the position in which the waiting time is the minimum from among the desired positions DP11, DP21, and DP31 as the placement position. For example, the deciding unit 134 decides the position in which the waiting time is the minimum from among the desired positions DP11, DP21, and DP31 as the placement position.

Consequently, the information processing apparatus 100 according to the first embodiment can further shorten the waiting time at the virtual bus stop in bad weather. Furthermore, the information processing apparatus 100 can fairly shorten the waiting time regarding each of the users who designate individual desired positions. In other words, information processing apparatus 100 can prevent the occurrence of unfairness, such as the waiting time of one user being extremely shorter and the waiting time of another user being extremely longer.

4-2. Position Decision Considering Destination

Furthermore, when designation of the destination made by a user is accepted, the deciding unit 134 decides the placement position based on the destination designated by the user. In such a case, the deciding unit 134 decides, from among the moving vehicles, the placement position in which the virtual riding point that corresponds to a riding point that is used to ride in the moving vehicle associated with the destination and that is virtually set is placed. This point will be described by using the example illustrated in FIG. 2. Here, to simplify the explanation, it is assumed that the user U1 has designated the desired position DP11 and also designated the destination "A station". Furthermore, it is assumed that the user U2 has designated the desired position DP21 and the destination "A station".

In such a case, the acquiring unit 132 refers to the operation schedule storage unit 122 and selects the on-demand bus B1 whose basic route passes along the destination "A station" or is the vicinity of the destination "A station" (for example, passes along within a predetermined distance from the A station). Furthermore, the acquiring unit 132 calculates whether the basic route of the selected on-demand bus B1 is within the predetermined distance from the desired positions DP11 and DP21. If the basic route is within the predetermined distance, the calculation unit 133 calculates the sum total of the moving cost in the flow of the process described in FIG. 8. Then, the deciding unit 134 decides the placement position based on the calculated sum total. Furthermore, the instruction unit 136 instructs the on-demand bus B1 to stop at the destination "A station" after getting the users U1 and U2 on the on-demand bus B1.

Furthermore, if the basic route of the on-demand bus B1 is not within the predetermined distance from the desired positions DP11 and DP21, the showing unit 135 can show each of the users that the target on-demand bus is not present.

Consequently, the information processing apparatus 100 according to the first embodiment can place a virtual bus stop in accordance with the designation made by the user and transports the users to their destinations. Consequently, the information processing apparatus 100 can enhance the convenience of users who use moving vehicles.

Furthermore, if the on-demand bus that heads toward the destination designated by the user is not present, the information processing apparatus 100 searches whether another transportation method (for example, a railway) heading toward the subject destination is present. Furthermore, if another transportation method (for example, a railway) heading toward the subject destination is present and if the basic route of the on-demand bus heading toward one of the subject railway stations is within the predetermined distance, the information processing apparatus 100 may place a virtual bus stop regarding the subject on-demand bus.

4-3. Position Decision Considering Time

Furthermore, if the designation of the expected departure time of a user or the desired arrival time to the destination made by the user is accepted, the deciding unit 134 decides a placement position based on the expected departure time or the desired arrival time designated by the user. For example, the deciding unit 134 decides, as the placement position, a predetermined position (for example, a desired position desired by the user) from among the positions in which the moving vehicle can arrive within the predetermined time from the expected departure time of the user. Alternatively, the deciding unit 134 decides the placement position such that the user arrives at the destination in time for the desired arrival time. This point will described by using the example illustrated in FIG. 9. FIG. 9 is a diagram illustrating an example of the information processing according to a modification of the first embodiment. Furthermore, the MAP1 illustrated in FIG. 9 is the same as that illustrated in FIG. 1 and FIG. 2.

First, it is assumed that the user U1 has designated the desired arrival time "10:00" at a destination "T university". Furthermore, it is assumed that the receiving unit 131 has accepted the setting of this information at "9:00" (setting accepted time: 9:00). In such a case, the deciding unit 134 decides the placement position related to the bus that can arrive at the destination "T university" at time "10:00" (Step S11). In this case, to simplify the explanation, similarly to the example described above, it is assumed that, regarding the on-demand bus B1, the deciding unit 134 has decided the desired position DP11 as the placement position.

In this state, the deciding unit 134 determines whether, if the on-demand bus B1 passes along the detour route RT20 that passes along the placement position DP11, the predicted arrival time at the destination "T university" is not after "10:00" (Step S12). Here, if the deciding unit 134 determines that the predicted arrival time is after "10:00", the deciding unit 134 again decides a placement position based on the subsequent operation schedule of the on-demand bus B1.

Then, the showing unit 135 calculates, from the current position HP11 of the user U1, needed time T11 that is needed by the user U1 to move to the desired position DP11 that has been set to the placement position (Step S13). Furthermore, the showing unit 135 calculates needed time T12 that is needed by the on-demand bus B1 to move from the current position of the on-demand bus B1 to the desired position DP11 (Step S14).

Then, based on the needed time T11 and the needed time T12, the showing unit 135 calculates the moving start time such that the waiting time at the desired position DP11 becomes further short (Step S15). Then, the showing unit 135 shows the user U1 the calculated moving start time (Step S16). Furthermore, the calculation process performed at Steps S13 to S15 may also be performed by the calculation unit 133.

Then, it is assumed that the user U3 has designated the desired arrival time "9:45" at a destination "B station". Furthermore, it is assumed that the receiving unit 131 has accepted the setting of this information at "9:25" (setting accepted time: 9:25). In such a case, the deciding unit 134 determines whether the destination "B station" is present on the operation route of the on-demand bus B1 that runs, as a detour, the detour route T20 for the user U1 (Step S21). If the deciding unit 134 determines that the destination "B station" is present, the deciding unit 134 determines whether the predicted arrival time at the destination "T university" desired by the user U1 is after "10:00", assuming that the on-demand bus B1 has passed along the detour route RT20 and the detour route RT21 that is toward, as a detour, the desired position DP21 desired by the user U2 (Step S22). If the deciding unit 134 determines that the predicted arrival time is not after "10:00", the deciding unit 134 also decides the desired position DP31 as the placement position (Step S23).

Then, the showing unit 135 calculates needed time T31 that is needed for the user U3 from the current position HP31 of the user U3 to the desired position DP31 that has been set to the placement position (Step S24). Furthermore, the showing unit 135 calculates needed time T32 that is needed for the on-demand bus B1 to move from the current position of the on-demand bus B1 to the desired position DP31 (Step S25).

Then, the showing unit 135 calculates the moving start time based on the needed time T31 and the needed time T32 such that the waiting time at the desired position DP31 is further short (Step S26). Then, the showing unit 135 shows the user U3 the calculated moving start time (Step S27). Furthermore, the calculation process performed at Steps S24 to S26 may also be performed in the calculation unit 133.

In this way, the information processing apparatus 100 according to the first embodiment decides a placement position based on the expected departure time or the desired arrival time in the case where designation of the expected departure time or the desired arrival time to the destination is accepted. Furthermore, the information processing apparatus 100 shows the moving start time to the user such that the waiting time at the virtual bus stop is further shorter. Consequently, the information processing apparatus 100 can place a virtual bus stop further considering the desire of the users, thereby enhancing the convenience of users who use moving vehicles.

4-4. Exhibit Information Considering Congestion Situation

When the information processing apparatus 100 decides a placement position based on the expected departure time or the desired arrival time accepted from a user, in some cases, for example, the information processing apparatus 100 allows the user to ride on the on-demand bus in the time zone in which the user is not able to be seated due to the commuting rush hour or the like. In such a case, for some users, a physical burden becomes increased because the users are not able to be seated. Thus, in accordance with the attribute information on a user (for example, broken a bone), the information processing apparatus 100 guides the user to ride on the on-demand bus in the time zone in which congestion can be avoided.

Consequently, the information processing apparatus 100 can enhance the convenience of users who use moving vehicles.

5. Effects

The information processing apparatus 100 according to the first embodiment includes the acquiring unit 132 and the deciding unit 134. The acquiring unit 132 acquires attribute information on a user. The deciding unit 134 decides, based on the attribute information acquired by the acquiring unit 132, a placement position in which a virtual riding point that corresponds to a riding point that is used for the user to ride in a moving vehicle and that is virtually set is placed.

Consequently, the information processing apparatus 100 according to the first embodiment can place the virtual bus stop at a more fair position in terms of the plurality of users. Furthermore, the information processing apparatus 100 according to the first embodiment can enhance the convenience of the users who use the moving vehicles.

Furthermore, the deciding unit 134 decides the placement position based on the position information related to the user.

Consequently, the information processing apparatus 100 according to the first embodiment can decide the placement position based on, for example, the position information indicating the position designated by the user, thereby enhancing the convenience of the user.

Furthermore, if a riding reservation for the moving vehicle made by the user is accepted, the deciding unit 134 decides the placement position based on, as the position information, desired riding position information that indicates a position desired by the user to ride in the moving vehicle and that was designated by the user at the time of the riding reservation.

Consequently, the information processing apparatus 100 according to the first embodiment can respond to the riding reservation, thereby enhancing the convenience of the user.

Furthermore, if an allocation instruction of the moving vehicle to a current position of the user given by the user is accepted, the deciding unit 134 decides the placement position based on, as the position information, current position information indicating the current position.

Consequently, the information processing apparatus 100 according to the first embodiment can respond to an immediate call, thereby enhancing the convenience of the user.

Furthermore, the information processing apparatus 100 according to the first embodiment includes the calculation unit 133. The calculation unit 133 calculates, based on a moving distance of the user to the position indicated by the position information and based on the attribute information, a moving cost that is a cost needed for the user to move the moving distance. Furthermore, the deciding unit 134 decides the placement position based on the moving cost calculated by the calculation unit 133.

Consequently, the information processing apparatus 100 according to the first embodiment can more fairly decide the placement position with respect to each of the users and decide, as the placement position, the position in which a higher priority is given to a user who has a heavy physical burden at the time of moving.

Furthermore, the deciding unit 134 decides the placement position such that a sum total of the moving cost of each of a plurality of the users is the minimum.

Consequently, the information processing apparatus 100 according to the first embodiment can more fairly decide the placement position with respect to each of the users and decide, as the placement position, the position in which a higher priority is given to a user who has a heavy physical burden at the time of moving.

Furthermore, the deciding unit 134 decides, as the placement position from among the positions indicated by the position information, a position in which the sum total of the moving cost of each of the plurality of the users is the minimum.

Consequently, the information processing apparatus 100 according to the first embodiment can more fairly decide the placement position with respect to each of the users and decide, as the placement position, the position in which a higher priority is given to a user who has a heavy physical burden at the time of moving is given.

Furthermore, the deciding unit 134 decides, based on the moving cost, the predetermined number of the placement positions.

Consequently, the information processing apparatus 100 according to the first embodiment can more fairly decide the placement position even though that number of virtual bus stops to be placed is limited.

Furthermore, when a virtual riding point is placed, the deciding unit 134 decides, based on waiting time of the user estimated at the placement position in which the virtual riding point was placed, a placement position in which the virtual riding point is to be placed.

Consequently, the information processing apparatus 100 according to the first embodiment can further shorten the waiting time at the virtual bus stop in, for example, bad weather, thereby enhancing the convenience of the user.

Furthermore, when a destination designated by the user is accepted, the deciding unit 134 decides the placement position based on the destination designated by the user.

Consequently, the information processing apparatus 100 according to the first embodiment can place the virtual bus stop in accordance with the instruction from the user and transport the user to the destination.

Furthermore, the deciding unit 134 decides, regarding the moving vehicle, the placement position in which the virtual riding point that corresponds to the riding point that is used to ride in the moving vehicle associated with the destination and that is virtually set is placed.

Consequently, the information processing apparatus 100 according to the first embodiment can place the virtual bus stop in accordance with the instruction received from the user and can transport the user to the destination.

Furthermore, when expected departure time of the user or desired arrival time to the destination designated by the user is accepted, the deciding unit 134 decides the placement position based on the expected departure time or the desired arrival time designated by the user.

Consequently, the information processing apparatus 100 according to the first embodiment can place the virtual bus stop by considering the desire of the user, thereby enhancing the convenience of the user.

Furthermore, the deciding unit 134 decides, as the placement position, a predetermined position from among the positions in which the moving vehicle can arrive within predetermined time after the expected departure time of the user.

Consequently, the information processing apparatus 100 according to the first embodiment can enhance the convenience of the user.

Furthermore, as the attribute information on the user, the acquiring unit 132 acquires age information on the user, gender information, information related to a health condition, information related to a physical disability, and information whether or not to accompany an infant.

Consequently, the information processing apparatus 100 according to the first embodiment can decide the placement position that effectively reflects the attribute information on the user.

Furthermore, the information processing apparatus 100 according to the first embodiment includes the showing unit 135. The showing unit 135 shows the user the information related to the placement position decided by the deciding unit 134.

Consequently, the information processing apparatus 100 according to the first embodiment can guide the user to, for example, the placement position, thereby enhancing the convenience of the user.

Second Embodiment

1. Example of Information Processing

In the following, an example of the information processing according to a second embodiment will be described with reference to FIG. 1. An information processing system according to the second embodiment includes an information processing apparatus 200 and the terminal device 10. Although not illustrated, in the example illustrated in FIG. 2, each of the users (the users U1, U2, and U3) has the terminal device 10. The information processing apparatus 200 according to the second embodiment is an example of the information processing apparatus SV described with reference to FIG. 1. For example, the information processing apparatus 200 is an information processing apparatus that is implemented by a single or a plurality of devices, such as a server device or a cloud system, that can communicate with the terminal devices 10 used by the users via a network, such as a mobile communication network or a wireless local area network (LAN).

As described with reference to FIG. 1, in order to avoid a worse situation of the operational efficiency, the second information processing apparatus 200 specifies the placement available position that is the position in which a virtual bus stop can be placed and decides the placement position based on the specified placement available position.

2. Configuration of the Information Processing Apparatus

Figure 10:
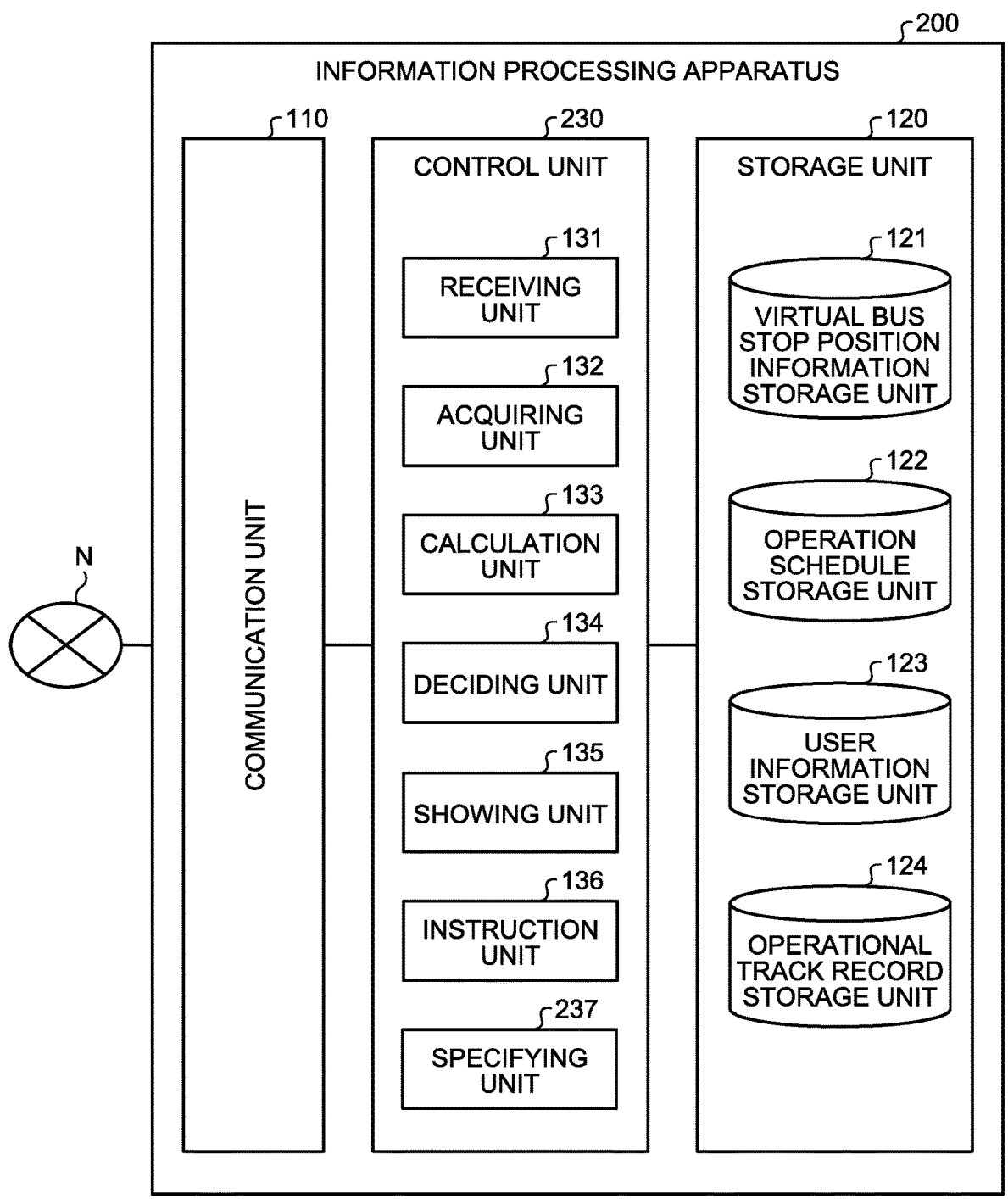
FIG. 10 is a diagram illustrating a configuration example of an information processing apparatus according to a second embodiment.

In the following, the information processing apparatus 200 according to the second embodiment will be described with reference to FIG. 10. FIG. 10 is a diagram illustrating a configuration example of the information processing apparatus 200 according to the second embodiment. As illustrated in FIG. 10, the information processing apparatus 200 includes the communication unit 110, the storage unit 120, and a control unit 230.

The information processing apparatus 200 according to the second embodiment further includes a specifying unit 237 in addition to the units included in the information processing apparatus 100 described in the first embodiment. Thus, descriptions of the storage unit and each of the units described with reference to FIG. 3 will be omitted.

Control Unit 230

The control unit 230 is implemented by a CPU, an MPU, or the like, executing various kinds of programs, which are stored in a storage device in the information processing apparatus 200, by using a RAM as a work area. Furthermore, the control unit 230 is implemented by, for example, an integrated circuit, such as an ASIC or an FPGA.

As illustrated in FIG. 10, the control unit 230 includes the receiving unit 131, the acquiring unit 132, the calculation unit 133, the deciding unit 134, the showing unit 135, the instruction unit 136, and the specifying unit 237 and implements or executes the function or the operation of the information processing described below. Furthermore, the internal configuration of the control unit 230 is not limited to the configuration illustrated in FIG. 10 and another configuration may also be used as long as the configuration in which the information processing described below is performed is used. Furthermore, the connection relation between each of the processing units included in the control unit 230 is not limited to the connection relation illustrated in FIG. 10 and another connection relation may also be used.

Specifying Unit 237

The specifying unit 237 specifies a placement available position that is a position in which a virtual riding point that corresponds to a riding point that is used to ride in a moving vehicle and that is virtually set can be placed. For example, the specifying unit 237 specifies a placement available position based on the operation information that is the information related to the operation situation of the moving vehicle.

Furthermore, the specifying unit 237 specifies, as the placement available position, the point other than a predetermined point based on the riding point that is used to ride in a moving vehicle. For example, as the predetermined point, the specifying unit 237 specifies, as the placement available position, the point on the road excluding the road that is included in a predetermined distance from the riding point that is used to ride in the moving vehicle. For example, as the predetermined point, the specifying unit 237 specifies, as the placement available position, the point included in the area other than a predetermined area centered at the riding point that is used to ride in the moving vehicle.

Furthermore, the deciding unit 134 decides, based on the placement available position specified by the specifying unit 237, the placement position in which the virtual riding point is to be placed.

3. Example of the Operation in Information Processing

Figure 11:
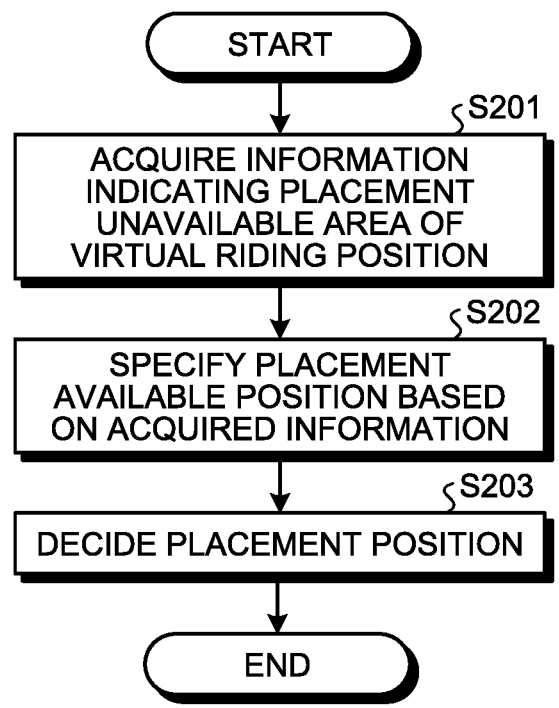
FIG. 11 is a flowchart illustrating an example of information processing according to the second embodiment.

In the following, the content of the process executed and implemented by the specifying unit 237 will be described by using the flowchart illustrated in FIG. 11. FIG. 11 is a flowchart illustrating an example of the information processing according to the second embodiment. Furthermore, the example illustrated in FIG. 1 is appropriately used.

First, the specifying unit 237 acquires information indicating the area in which the virtual riding position (for example, virtual bus stop) is not able to be placed (Step S201). For example, it is assumed that, as the information indicating the area in which the virtual riding position (for example, virtual bus stop) is not able to be placed, the information processing apparatus 200 previously stores, in a predetermined storage unit, the information indicating the size of the area with the radius centered at the position (bus stop position), in which the bus stop (either of the existing bus stop and virtual bus stop) is present, that is to be set to the area in which the virtual bus stop is not able to be placed. Here, it is assumed that the specifying unit 237 has acquired the information indicating that the circular area with the radius R centered at the bus stop position is set to the area in which the virtual bus stop is not able to be placed.

The specifying unit 237 specifies the placement available position based on the acquired information (Step S202). For example, in the example illustrated in FIG. 1, the specifying unit 237 specifies, as the placement available position, the area other than the circular area with the radius R centered at the position "S-PT1" in which the existing bus stop ST1 is present and the circular area with the radius R centered at the position "S-PT2" in which the existing bus stop ST2 is present.

Furthermore, in the example illustrated in FIG. 1, the specifying unit 237 may also specify, as the placement available position, the point on the road except for the road that is included within the predetermined distance from the position "S-PT1" in which the existing bus stop ST1 is present and the position "S-PT2" in which the existing bus stop ST2 is present.

Then, based on the placement available position specified by the specifying unit 237, the deciding unit 134 decides the placement position in which the virtual riding point is to be placed (Step S203). The process of deciding the placement position is the same as that described in the first embodiment; however, in the second embodiment, the deciding unit 134 decides the placement position targeted for the placement available position that has been specified by the specifying unit 237.

For example, if the deciding unit 134 once decides the desired position DP11 as the placement position, in the case where the desired position DP11 is located at the position other than the placement available position, the deciding unit 134 decides, as the placement position, the position that is further closer from the desired position DP11 and that is included in the placement available position.

4. Modification

The information processing apparatus 200 according to the second embodiment described above may also be performed with various kinds of embodiments other than the embodiment described above. Therefore, another embodiment of the information processing apparatus 200 described above will be described below.

4-1. Dynamic Change

The specifying unit 237 specifies the placement available position based on the operation information that is the information related to the operation situation of a moving vehicle. For example, the specifying unit 237 dynamically changes the placement available position based on the operation situation.

As described above, it is assumed that the circular area with the radius R centered at the bus stop position is determined to be the area in which the virtual bus stop is not able to be placed. In this state, the specifying unit 237 acquires the operation situation of, for example, the currently operating on-demand bus. Then, if a delay occurs in the operation schedule of the on-demand bus based on the acquired operation situation, the specifying unit 237 sets the length of the radius R longer than a predetermined value that is previously set. Namely, the specifying unit 237 increases the region of the circular area and decides the area other than the increased circular area as the placement available position.

In this way, if a delay occurs in the operation schedule of the on-demand bus, the specifying unit 237 changes the placement available position smaller by increasing the area in which placement is unavailable. By decreasing the placement available area, the virtual bus stop can only be placed at further limited positions, the information processing apparatus 200 can prevent the occurrence of delay in the operation schedule due to an increase the number of virtual bus stops.

4-2. Specifying a Placement Available Position Made by Riding Reservation

Furthermore, if a riding reservation for a moving vehicle made by a user is accepted, the specifying unit 237 specifies the placement available position as the operation information based on the operation history up to this point. For example, it is assumed that a riding reservation from the desired position DP11 at "10:00" on the following day made by the user U1 is accepted. In such a case, at the current moment, what kind of change in the operation situation occurs around the desired position DP11 is unknown.

Thus, the information processing apparatus 200 estimates, based on the operation history up to this point, the operation situation around the desired position DP11 at "10:00" on the following day. It is assumed that the information processing apparatus 200 estimates, based on the operation history up to this point, that there is a possibility that congestion occurs around the desired position DP11. If a virtual bus stop has been placed in spite of the occurrence of congestion, this causes a delay in the operation schedule. Thus, by changing the placement available position by increasing the circular area (placement unavailable area) of the existing bus stop ST1, the specifying unit 237 performs control such that the desired position DP11 (and around the area) is not decided as the placement position.

Consequently, the information processing apparatus 200 according to the second embodiment can specify the placement available position that has been set by considering the operation situation even if the riding reservation has been made.

4-3. Specifying a Placement Available Position Due to an Immediate Call

Furthermore, if an allocation instruction (immediate call) of a moving vehicle to the current position of a user sent from the user is accepted, the specifying unit 237 specifies, as the operation information, the placement available position based on the current operation situation. For example, it is assumed that an immediate call, made by the user U1, for a vehicle to be allocated around the desired position DP11 after "15 minutes" from now is accepted.

For example, at present, it is assumed that congestion occurs around the desired position DP11. If a virtual bus stop has been placed in spite of the occurrence of congestion, this causes a delay in operation schedule. Thus, by changing the placement available position by increasing the circular area (placement unavailable area) of the existing bus stop ST1, the specifying unit 237 performs control such that the desired position DP11 (and around the area) is not decided as the placement position.

Consequently, the information processing apparatus 200 according to the second embodiment can specify the placement available position that has been set by considering the operation situation even if the immediate call has been made.

4-4. Process Performed by Considering the User Attribute

Furthermore, the specifying unit 237 specifies the placement available position based on the attribute information on the user. For example, as described in the first embodiment, the user U1 has the health condition "pregnant woman" as the attribute information indicating a heavy physical burden. Here, it is assumed that the desired position DP11 designated by the user U1 is included in the placement unavailable area. In such a case, the deciding unit 134, as an exception, the desired position DP11 that is included in the placement unavailable area as the placement position.

Consequently, the information processing apparatus 200 according to the second embodiment can decide, based on the attribute information, the placement position such that no burden is imposed on the user.

5. Effects

The information processing apparatus 200 according to the second embodiment includes the specifying unit 237 and the deciding unit 134. The specifying unit 237 specifies the placement available position that is the position in which a virtual riding point corresponding to a riding point that is used to ride in a moving vehicle and that is virtually set can be placed. The deciding unit 134 decides, based on the placement available position specified by the specifying unit 237, the placement position in which the virtual riding point is to be placed.

Consequently, the information processing apparatus 200 according to the second embodiment can effectively suppress a decrease in the operational efficiency of a moving vehicle and an increase in the cost needed to operate the moving vehicle.

Furthermore, the specifying unit 237 specifies the placement available position based on the operation information that is the information related to the operation situation of the moving vehicle.

Consequently, the information processing apparatus 200 according to the second embodiment can specify the placement available position with high accuracy.

Furthermore, the specifying unit 237 specifies, as the placement available position, the point other than the predetermined point that is based on the riding point used to ride in the moving vehicle.

Consequently, the information processing apparatus 200 according to the second embodiment can prevent the virtual riding point from being placed at the position that is, for example, too close to a certain riding point, thereby suppressing a decrease in the operational efficiency of a moving vehicle and an increase in the cost needed to operate the moving vehicle.

Furthermore, as the predetermined point, the specifying unit 237 specifies, as the placement available position, the point on the road other than the road that is included in the predetermined distance from the riding point that is used to ride in the moving vehicle.

Consequently, the information processing apparatus 200 according to the second embodiment can prevent the virtual riding point from being placed at the position that is, for example, too close to a certain riding point, thereby suppressing a decrease in the operational efficiency of a moving vehicle and an increase in the cost needed to operate the moving vehicle.

Furthermore, as the predetermined point, the specifying unit 237 specifies, as the placement available position, the point included in the area other than the predetermined area centered at the riding point that is used to ride in the moving vehicle.

Consequently, the information processing apparatus 200 according to the second embodiment can prevent the virtual riding point from being placed at the position that is, for example, too close to a certain riding point, thereby suppressing a decrease in the operational efficiency of a moving vehicle and an increase in the cost needed to operate the moving vehicle.

Furthermore, the specifying unit 237 dynamically changes the placement available position based on the operation situation.

Consequently, the information processing apparatus 200 according to the second embodiment can only place the virtual bus stop at further limited positions, thereby preventing the occurrence of delay in the operation schedule due to an increase in the number of virtual bus stops.

Furthermore, if a riding reservation for a moving vehicle made by a user is accepted, the specifying unit 237 specifies, as the operation information, the placement available position based on the operation history up to this point.

Consequently, the information processing apparatus 200 according to the second embodiment can specify the placement available position that has been set by considering the operation situation even if the riding reservation has been made.

Furthermore, if an allocation instruction of a moving vehicle to the current position of the user sent from the user is accepted, the specifying unit 237 specifies, as the operation information, the placement available position based on the current operation situation.

Consequently, the information processing apparatus 200 according to the second embodiment can specify the placement available position that has been set by considering the operation situation even if an immediate call has been made.

Third Embodiment

1. Example of Information Processing

In the following, an example of the information processing according to the third embodiment will be described with reference to FIG. 1. An information processing system according to the third embodiment includes an information processing apparatus 300 and the terminal device 10. Although not illustrated, in the example illustrated in FIG. 1, each of the users (the user U1, U2, and U3) has the terminal device 10. The information processing apparatus 300 according to the third embodiment is an example of the information processing apparatus SV described with reference to FIG. 1. For example, the information processing apparatus 300 is an information processing apparatus that is implemented by a single or a plurality of devices, such as a server device or a cloud system, that can communicate with the terminal devices 10 used by the users via a network, such as a mobile communication network or a wireless local area network (LAN).

As described with reference to FIG. 1, the route bus operation company desires, for example, on-demand buses are constantly used in any time zones. Because of this, the information processing apparatus 300 provides various incentives to users in order to allow each of the users to increase the willingness to use the on-demand bus.

2. Configuration of an Information Processing Apparatus

Figure 12:
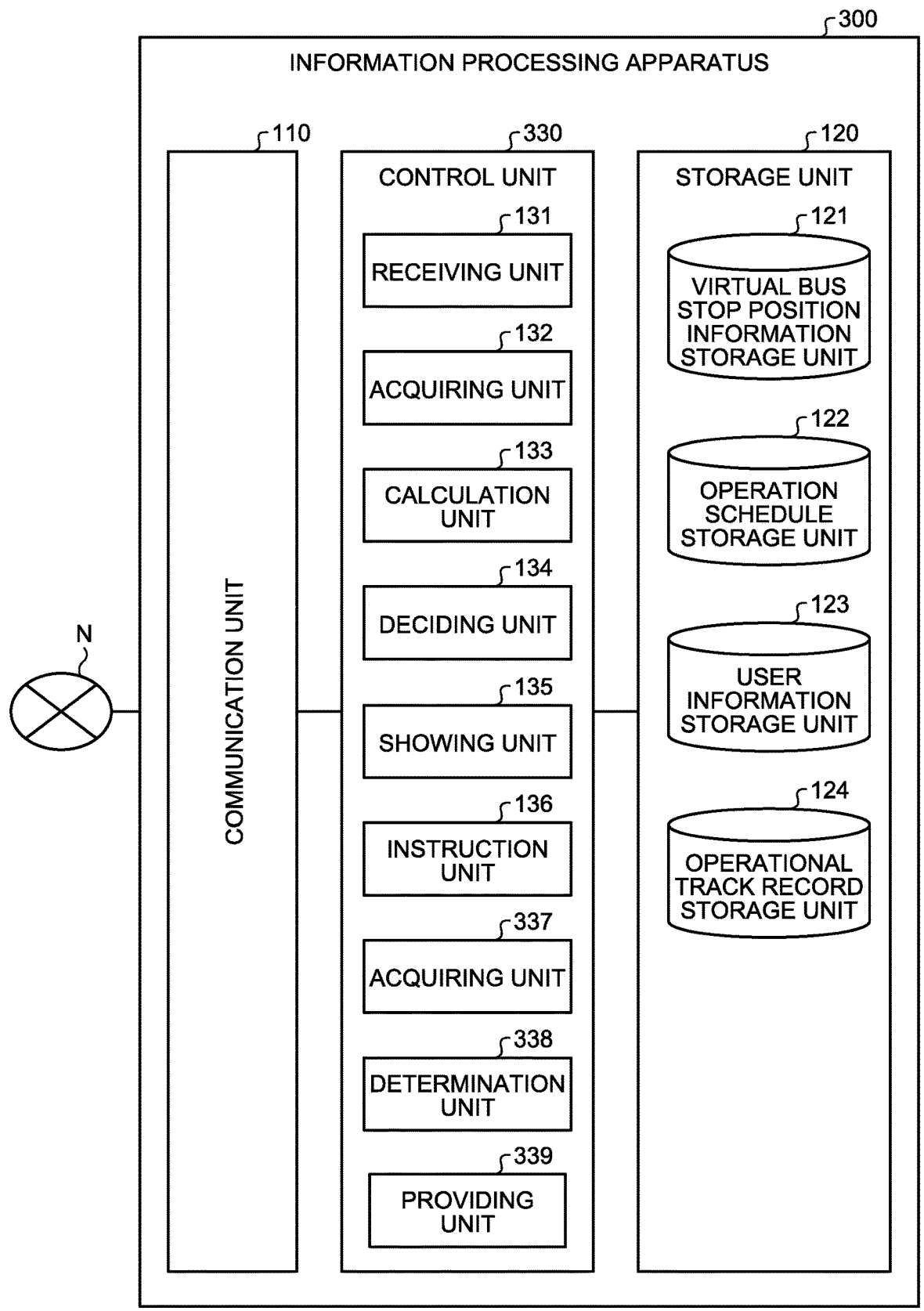
FIG. 12 is a diagram illustrating a configuration example of an information processing apparatus according to a third embodiment.

In the following, the information processing apparatus 300 according to the third embodiment will be described with reference to FIG. 12. FIG. 12 is a diagram illustrating a configuration example of the information processing apparatus 300 according to the third embodiment. As illustrated in FIG. 12, the information processing apparatus 200 includes the communication unit 110, the storage unit 120, and a control unit 330.

The information processing apparatus 300 according to the third embodiment further includes an acquiring unit 337, a determination unit 338, and a providing unit 339 in addition to the units included in the information processing apparatus 100 described in the first embodiment. Thus, descriptions of the storage unit and each of the units described with reference to FIG. 3 will be omitted. Furthermore, the information processing apparatus 300 may also include the specifying unit 237 according to the second embodiment.

Control Unit 330

The control unit 330 is implemented by a CPU, an MPU, or the like, executing various kinds of programs, which are stored in a storage device in the information processing apparatus 300, by using a RAM as a work area. Furthermore, the control unit 330 is implemented by, for example, an integrated circuit, such as an ASIC or an FPGA.

As illustrated in FIG. 12, the control unit 330 includes the receiving unit 131, the acquiring unit 132, the calculation unit 133, the deciding unit 134, the showing unit 135, the instruction unit 136, the acquiring unit 337, the determination unit 338, and the providing unit 339 and implements or executes the function or the operation of the information processing described below. Furthermore, the internal configuration of the control unit 330 is not limited to the configuration illustrated in FIG. 12 and another configuration may also be used as long as the configuration in which the information processing described below is performed is used. Furthermore, the connection relation between each of the processing units included in the control unit 330 is not limited to the connection relation illustrated in FIG. 12 and another connection relation may also be used.

Acquiring Unit 337

The acquiring unit 337 acquires a usage situation of a user who has used a moving vehicle. For example, the acquiring unit 337 acquires, via various sensors installed in an on-demand bus that is the moving vehicle, a usage situation of a user who has used a moving vehicle.

Determination Unit 338

The determination unit 338 determines, based on the usage situation acquired by the acquiring unit 337, whether a user has used a moving vehicle in a predetermined time zone or at a predetermined location.

Providing Unit 339

The providing unit 339 provides a predetermined incentive to a user in accordance with the usage situation acquired by the acquiring unit 337. Because the determination unit 338 determines, based on the usage situation acquired by the acquiring unit 337, whether a user has used a moving vehicle in the predetermined time zone or at the predetermined location, the providing unit 339 provides a predetermined incentive to the user in accordance with the determination result obtained by the determination unit 338.

Furthermore, if it is determined, by the determination unit 338, that the user has used the moving vehicle in the predetermined time zone, the providing unit 339 provides, as a predetermined incentive, an incentive that is in accordance with the usage amount that corresponds to the number of users who uses a moving vehicle in the predetermined time zone. For example, the providing unit 339 sets, as an incentive in accordance with the usage amount, a usage fee to be paid for a moving vehicle used by a user to the value lower than the set usage fee.

3. Example of the Operation in Information Processing

Figure 13:
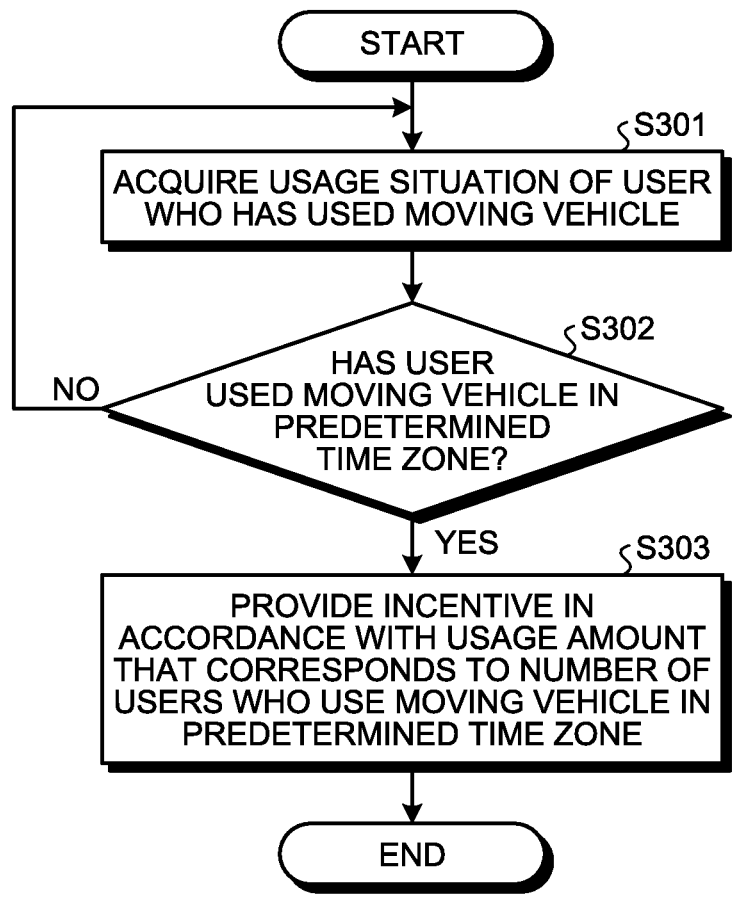
FIG. 13 is a flowchart illustrating an example of information processing according to the third embodiment.

In the following, the content of the process executed and implemented by the acquiring unit 337, the determination unit 338, and the providing unit 339 will be described by using the flowchart illustrated in FIG. 13. FIG. 13 is a flowchart illustrating an example of the information processing according to the third embodiment. Furthermore, the example illustrated in FIG. 1 is appropriately used.

First, the acquiring unit 337 acquires a usage situation of the user who has used a moving vehicle (Step S301). Here, as indicated by (b) illustrated in FIG. 1, it is assumed that a placement position is decided based on the information designated by the users U1 to U3 or the attribute information and it is assumed that the on-demand bus B1 has been used because a user rides on the on-demand bus B1 from the decided placement position. The acquiring unit 337 can acquire the usage situation of the on-demand bus B1 via, for example, various sensors in the on-demand bus B1. For example, the acquiring unit 337 can acquire the usage situation indicating when, from where, and which on-demand bus running toward the target destination (destination) as the basic route the user has used the on-demand bus.

In the example of (b) in FIG. 1, the acquiring unit 337 acquires, as the usage situation, information indicating that the user U1 used the on-demand bus B1 operated between "14:00 and 15:00". Furthermore, in the example of (b) in FIG. 1, the acquiring unit 337 acquires, as the usage situation, information indicating that the user U2 used the on-demand bus B1 operated between "8:00 and 9:00". Furthermore, in the example of (b) in FIG. 1, the acquiring unit 337 acquires, as the usage situation, information indicating that the user U3 used the on-demand bus B1 operated between "10:00 and 11:00".

Then, based on the usage situation acquired by the acquiring unit 337 the determination unit 338 determines whether the user has used the moving vehicle in a predetermined time zone (Step S302). The predetermined time mentioned here is, for example, the previously known time zone in which the on-demand bus is crowded due to the commuting rush hour (for example, between 8:00 and 9:00 and between 9:00 and 10:00). Another example of the predetermined time is the previously known time zone in which the on-demand bus is deserted because very few users are on the on-demand bus (for example, between 10:00 and 11:00 and between 14:00 and 15:00).

If a user does not use a moving vehicle in the predetermined time zone (No at Step S302), the determination unit 338 returns to Step S301. In contrast, if the determination unit 338 determines that the user used the moving vehicle in the predetermined time zone (Yes at Step S302), the determination unit 338 moves the process to the providing unit 339.

If it is determines that the user used the moving vehicle in the predetermined time zone (Yes at Step S302), the providing unit 339 provides the incentive in accordance with the usage amount that corresponds to the number of users who use the moving vehicle in the subject predetermined time zone (Step S303). For example, as the incentive in accordance with the usage amount, the providing unit 339 sets the usage fee to be paid for the moving vehicle used by the user to the value lower than the set usage fee.

Here, if it is known that the usage amount of the on-demand bus B1 used between "14:00 and 15:00" is lower than the average daily usage amount of the on-demand bus B1 per day, the providing unit 339 provides an incentive to the user U1 in response to the fact that the user U1 used the on-demand bus B1 between "14:00 and 15:00" in which the usage amount is low. For example, the providing unit 339 sets the fare (250 yen) that is lower than the fare (to be set to 300 yen) that is originally to be paid by the user U1.

Furthermore, if it is known that the usage amount of the on-demand bus B1 used between "10:00 and 11:00" is lower than the average daily usage amount of the on-demand bus B1 per day, the providing unit 339 provides an incentive to the user U3 in response to the fact that user U3 used the on-demand bus B1 between "10:00 and 11:00" for which the usage amount is low. For example, the providing unit 339 sets the fare (280 yen) that is lower than the fare (to be set to 300 yen) that is originally to be paid by the user U3.

In contrast, the providing unit 339 does not provide an incentive to the user U2 who used the on-demand bus B1 at the time between "8:00 and 9:00" for which the usage amount of the on-demand bus B1 is greater than the average daily usage amount of the on-demand bus B1 due to the commuting rush hour.

4. Modification

The information processing apparatus 300 according to the third embodiment described above may also be performed with various kinds of embodiments other than the embodiment described above. Therefore, another embodiment of the information processing apparatus 300 described above will be described below.

4-1. Incentive (1)

The providing unit 339 sets, as the incentive in accordance with the usage amount, the usage fee paid for a moving vehicle used by a user to a value of a fixed amount that is not changed in accordance with the moving distance of the user moved by using the moving vehicle. For example, it is assumed that the on-demand bus B1 illustrated in FIG. 1 is a distance-based fee system in which the fare is increased in accordance with the moving distance.

In such a case, the providing unit 339 does not increase the fare of the user U1 based on the moving distance in response to the fact that the user U1 used the on-demand bus B1 between "14:00 and 15:00" in which the usage amount is low and then sets the fare to the predetermined fare. For example, in the case of the moving distance of the user U1, the providing unit 339 sets the fare to "300 yen" that is the base fare of the user U1, although the fare to be paid is "400 yen".

Consequently, the information processing apparatus 300 according to the third embodiment can make users aware that the fare is attractive on condition that a moving vehicle is used in the predetermined time zone, thereby allowing the users to effectively use the moving vehicle in the subject time zone. As the result, the information processing apparatus 300 according to the third embodiment can equalize the usage situation of the moving vehicles to be used.

Furthermore, the providing unit 339 may also provide an incentive of, for example, using a usual distance-based fee system in the congestion time zone due to the commuting rush hour or the like and keeping, in the rest of the time zone other than the congestion time zone due to the commuting rush hour, the fare to the predetermined fare.

4-2. Incentive (2)

Furthermore, if it is determined, by the determination unit 338, that a user used a moving vehicle in the predetermined time zone, the providing unit 339 provides, as a predetermined incentive, a point that is in accordance with the usage amount that corresponds to the number of users who uses the moving vehicle in the predetermined time zone.

In the example described above, a case in which the providing unit 339 provides the incentive of decreasing the fare in accordance with the usage amount has been described. However, the providing unit 339 may also provide the point that is in accordance with the usage amount. For example, the providing unit 339 provides an electronic point corresponding to a predetermined amount in response to the fact that the user U1 used the on-demand bus B1 between "14:00 and 15:00" in which the usage amount is low.

Consequently, the information processing apparatus 300 according to the third embodiment can make users aware that the point used for a purchase is given on condition that a moving vehicle is used in the predetermined time zone, thereby allowing the users to effectively use the moving vehicle in the subject time zone. As the result, the information processing apparatus 300 according to the third embodiment can equalize the usage situation of the moving vehicles to be used.

4-3. Incentive (3)

In the examples described above, a case in which the providing unit 339 provides an incentive related to money has been described. However, the providing unit 339 may also provide an incentive related to a moving route of a moving vehicle. Specifically, if it is determined by the determination unit 338 that a user used a moving vehicle in a predetermined time zone, the providing unit 339 controls, as a predetermined incentive, the moving route of the moving vehicle in accordance with the user. For example, the providing unit 339 controls, as the predetermined incentive, the moving route of the moving vehicle such that the moving vehicle approaches the destination designated by the user.

For example, it is assumed that the user U1 used the on-demand bus B1 between "14:00 and 15:00" in which the usage amount is low. Furthermore, it is assumed that the user U1 previously designates the destination "T university" with respect to the information processing apparatus 300. Furthermore, the on-demand bus B1 can relatively and flexibly change the operation route because the usage amount of the on-demand bus B1 is low between "14:00 and 15:00". Specifically, the on-demand bus B1 have a high degree of flexibility in selecting which detour route to be used as the detour route other than the basic route at the time between "14:00 and 15:00" in which the usage amount is low.

Because of this, the providing unit 339 controls the moving route of the on-demand bus B1 in accordance with the user U1, i.e., in accordance with the destination "T university" of the user U1. For example, even if the on-demand bus B1 is not the bus that passes along the destination "T university" of the user U1 (outside the basic route), the providing unit 339 provides the incentive of, for example, changing the moving route of the on-demand bus B1 such that the on-demand bus B1 heads to the destination "T university".

Consequently, the information processing apparatus 300 according to the third embodiment can make users aware that the moving vehicle responds to a user's request for the destination in the predetermined time zone, thereby allowing the users to effectively use the moving vehicle in the subject time zone. As the result, the information processing apparatus 300 according to the third embodiment can equalize the usage situation of the moving vehicles to be used.

4-4. Incentive (4)

Furthermore, the determination unit 338 determines, based on the usage situation acquired by the acquiring unit 337, whether a user used the moving vehicle running in the predetermined route. Then, if it is determined, by the determination unit 338, that the user used the moving vehicle running in the predetermined route, the providing unit 339 provides a predetermined incentive to the subject user. For example, if it is determined, by the determination unit 338, that the user used the moving vehicle running along the route having a longer distance to the destination from among the routes to the destination of the predetermined point, the providing unit 339 provides the predetermined incentive to the user.

Here, as the on-demand bus that is operated between an event venue "hall H" and a "C station", the on-demand buses B2 and B3 are used as examples. Furthermore, although the destination (the hall H) and the departure place (C station) are common to both the on-demand buses B2 and B3, the operation routes connecting the two places are different. For example, it is assumed that the basic route in which the on-demand bus B3 is running is longer than the basic route in which the on-demand bus B2 is running. In other words, the on-demand bus B3 runs the operation route that is longer than that of the on-demand bus B2.

Furthermore, it is assumed that the current time is "20:30", the event performed in the "hall H" has been ended, and the on-demand bus B2 that can arrive at the "C station" earlier than the on-demand bus B3 is very crowded, whereas it is assumed that the on-demand bus B3 is relatively less crowded.

In this state, the acquiring unit 337 acquires the usage situation of each of the users from the on-demand buses B2 and B3. Furthermore, based on the usage situations acquired by the acquiring unit 337, the determination unit 338 determines which users rode on the on-demand bus B2 and which users rode on the on-demand bus B3 between "20:00 and 21:00". Here, it is assumed that the determination unit 338 determines that, for example, 50 users rode on the on-demand bus B2 and two users of the users U5 and U6 rode on the on-demand bus B3.

In such a case, the providing unit 339 provides the predetermined incentive to the users U5 and U6 who used the on-demand bus B3 that runs a longer route. Many users tend to use the on-demand bus B2 that can arrive at the "C station" earlier even if the on-demand bus B2 is crowded; however, as an incentive provided in response to having used the on-demand bus B3 in spite of this state, the providing unit 339 provides the predetermined incentive to the users U5 and U6 who used the on-demand bus B3. Furthermore, this incentive also includes an implication of contributing elimination of congestion of the on-demand bus B2.

Consequently, the information processing apparatus 300 according to the third embodiment can make users aware that an incentive is provided on condition that the moving vehicle running the predetermined route is used, thereby allowing the users to effectively use the moving vehicle that runs the subject route. As the result, the information processing apparatus 300 according to the third embodiment can equalize the usage situation of the moving vehicles to be used.

Furthermore, in the example described above, the showing unit 135 may also propose to use the on-demand bus B3 by showing, to each of the users, information indicating that, if the users ride on the on-demand bus B3, the predetermined incentive is provided (for example, the fare is decreased from the standard fee).

4-5. Incentive (5)

Furthermore, if a user used the moving vehicle running toward the predetermined destination, the providing unit 339 provides an incentive related to the predetermined destination. For example, if an event V is held at this destination, the showing unit 135 previously shows the event information related to the event V to the user.

Then, the determination unit 338 determines whether the user to whom the event information is shown has used the on-demand bus that runs toward the event V. Then, the providing unit 339 provides the predetermined incentive to the user who was determined to have used the on-demand bus running toward the event V. For example, the providing unit 339 provides, as an incentive, a coupon that can be used for the on-demand bus that runs toward the event V and a coupon that can be used at shops in the vicinity of the venue in which the event V is held.

Furthermore, instead of providing the coupon that can be used at shops in the vicinity of the venue in which the event V is held as an incentive, the providing unit 339 may also provide, under the condition that the user used the on-demand bus running toward the event V, to a user who made a purchase at the shop or had a meal, an incentive, such as setting the fare of the return on-demand bus to the value lower than the standard fee.

Consequently, the information processing apparatus 300 according to the third embodiment can increase the number of users of the moving vehicle and contribute an increase in sales of the business connected to the destination.

4-6. Exhibiting Information for an Incentive

The showing unit 135 shows the information related to an incentive. For example, the showing unit 135 shows the information related to the incentive that is provided if a moving vehicle is used. As an example, when a description will be given by using an example of modification "4-1", the showing unit 135 previously shows information related to an incentive to a user who installs the riding guide application AP in the terminal device 10 indicating what kind of incentive the user can obtain that is associated with information indicating which time zone the user uses the on-demand bus. Furthermore, the information is not limited to this example, the showing unit 135 can previously show how to use the moving vehicle that is associated with the information indicating what kind of incentive is provided.

Consequently, the information processing apparatus 300 according to the third embodiment can motivate to act the behavior targeted for the incentive to be provided.

5. Effects

The information processing apparatus 300 according to the third embodiment includes the acquiring unit 337 and the providing unit 339. The acquiring unit 337 acquires the usage situation of a user who used a moving vehicle. The providing unit 339 provides a predetermined incentive to the user in accordance with the usage situation acquired by the acquiring unit 337.

Consequently, the information processing apparatus 300 according to the third embodiment can equalize the usage situation in which the moving vehicles are used.

Furthermore, the information processing apparatus 300 according to the third embodiment includes the determination unit 338. The determination unit 338 determines, based on the usage situation acquired by the acquiring unit 337, whether the user used the moving vehicle in the predetermined time zone or the predetermined location. Furthermore, the providing unit 339 provides the predetermined incentive to the user in accordance with the determination result obtained by the determination unit 338.

Consequently, the information processing apparatus 300 according to the third embodiment can provide an incentive in accordance with the predetermined time zone or the predetermined location.

Furthermore, if it is determined, by the determination unit 338, that the user used the moving vehicle in the predetermined time zone, the providing unit 339 provides, as the predetermined incentive, an incentive that is in accordance with the usage amount that is the number of users who uses the moving vehicle in the predetermined time zone.

Consequently, if the number of users of the moving vehicle in, for example, the predetermined time zone is small, the information processing apparatus 300 according to the third embodiment can effectively increase the number of users of the moving vehicle in the subject predetermined time zone. Furthermore, the information processing apparatus 300 can equalize the usage situation in which the moving vehicles are used.

Furthermore, the providing unit 339 sets, as the incentive that is in accordance with the usage amount, the usage fee paid for a moving vehicle used by a user to a value lower than the usage fee.

Consequently, if the number of users of the moving vehicle in, for example, the predetermined time zone is small, the information processing apparatus 300 according to the third embodiment can effectively increase the number of users of the moving vehicle in the subject predetermined time zone. Furthermore, the information processing apparatus 300 can equalize the usage situation in which the moving vehicles are used.

Furthermore, the providing unit 339 sets, as the incentive that is in accordance with the usage amount, the usage fee paid for a moving vehicle used by a user to a value of a fixed amount that is not changed in accordance with the moving distance of the user moved by using the moving vehicle.

Consequently, if the number of users of the moving vehicle in, for example, the predetermined time zone is small, the information processing apparatus 300 according to the third embodiment can effectively increase the number of users of the moving vehicle in the subject predetermined time zone. Furthermore, the information processing apparatus 300 can equalize the usage situation in which the moving vehicles are used.

Furthermore, if it is determined, by the determination unit 338, the user used the moving vehicle in the predetermined time zone, the providing unit 339 provides, as the predetermined incentive, a point that is in accordance with the usage amount that corresponds to the number of users who use the moving vehicle in the predetermined time zone.

Consequently, the information processing apparatus 300 according to the third embodiment can make users aware that a point that can be used for a purchase is provided on condition that the moving vehicle is used in the predetermined time zone, thereby effectively allowing the user to use the moving vehicle in the subject time zone. As the result, the information processing apparatus 300 according to the third embodiment can equalize the usage situation of the moving vehicles to be used.

Furthermore, if it is determined, by the determination unit 338, that the user used the moving vehicle in the predetermined time zone, the providing unit 339 controls, as the predetermined incentive, the moving route of the moving vehicle in accordance with the user.

Consequently, the information processing apparatus 300 according to the third embodiment can make users aware that the moving vehicle responds to a user's request for the destination in the predetermined time zone, thereby allowing the users to effectively use the moving vehicle in the subject time zone. As the result, the information processing apparatus 300 according to the third embodiment can equalize the usage situation of the moving vehicles to be used.

Furthermore, the providing unit 339 controls, as the predetermined incentive, the moving route of the moving vehicle such that the moving vehicle approaches the destination designated by the user.

Consequently, the information processing apparatus 300 according to the third embodiment can make users aware that the moving vehicle responds to a user's request for the destination in the predetermined time zone, thereby allowing the users to effectively use the moving vehicle in the subject time zone. As the result, the information processing apparatus 300 according to the third embodiment can equalize the usage situation of the moving vehicles to be used.

Furthermore, the determination unit 338 determines, based on the usage situation acquired by the acquiring unit 337, whether the user used the moving vehicle that runs the predetermined route. Then, if it is determined, by the determination unit 338, that the user used the moving vehicle that runs the predetermined route, the providing unit 339 provides the predetermined incentive to the subject user.

Consequently, the information processing apparatus 300 according to the third embodiment can make users aware that an incentive is provided on condition that the moving vehicle running the predetermined route is used, thereby allowing the users to effectively use the moving vehicle that runs the subject route. As the result, the information processing apparatus 300 according to the third embodiment can equalize the usage situation of the moving vehicles to be used.

Furthermore, if it is determined, by the determination unit 338, that the user used the moving vehicle running along the route having a distance longer to the destination from among the routes to the destination of the predetermined point, the providing unit 339 provides the predetermined incentive to the user.

Consequently, the information processing apparatus 300 according to the third embodiment can make users aware that an incentive is provided on condition that the moving vehicle running the predetermined route is used, thereby allowing the users to effectively use the moving vehicle that runs the subject route. As the result, the information processing apparatus 300 according to the third embodiment can equalize the usage situation of the moving vehicles to be used.

Furthermore, if a user used the moving vehicle running toward the predetermined destination, the providing unit 339 provides an incentive related to the predetermined destination.

Consequently, the information processing apparatus 300 according to the third embodiment can increase the number of users of the moving vehicle and contribute an increase in sales of the business connected to the destination.

The showing unit 135 shows the information related to the incentive that is provided if a moving vehicle is used.

Consequently, the information processing apparatus 300 according to the third embodiment can motivate to act the behavior targeted for the incentive to be provided.

Fourth Embodiment

1. Example of the Riding Intention Determination Process

Each of the embodiments described above indicates an example in which, for example, each of the information processing apparatuses 100, 200, and 300 acquires the attribute information on the users and decides, based on the acquired attribute information, a placement position in which a virtual riding point that corresponds to a riding point that is used for a user to ride in a moving vehicle and that is virtually set is placed. However, an information processing apparatus 400 having the function of the information processing apparatuses 100, 200, and 300 may also perform the following riding intention determination process before deciding the placement position. Specifically, the information processing apparatus 400 acquires a positional relationship between the riding position information that indicates a riding point for a ride in a moving vehicle and the user position information that indicates the current position of the user. Then, the information processing apparatus 400 determines, based on the acquired positional relationship and the behavior information that indicates the behavior of the user, whether the user has an intention to ride in a moving vehicle. This point will be described with reference to the example illustrated in FIG. 14. Furthermore, the information processing apparatus 400 can also be restated as a riding intention determination device.

Figure 14:
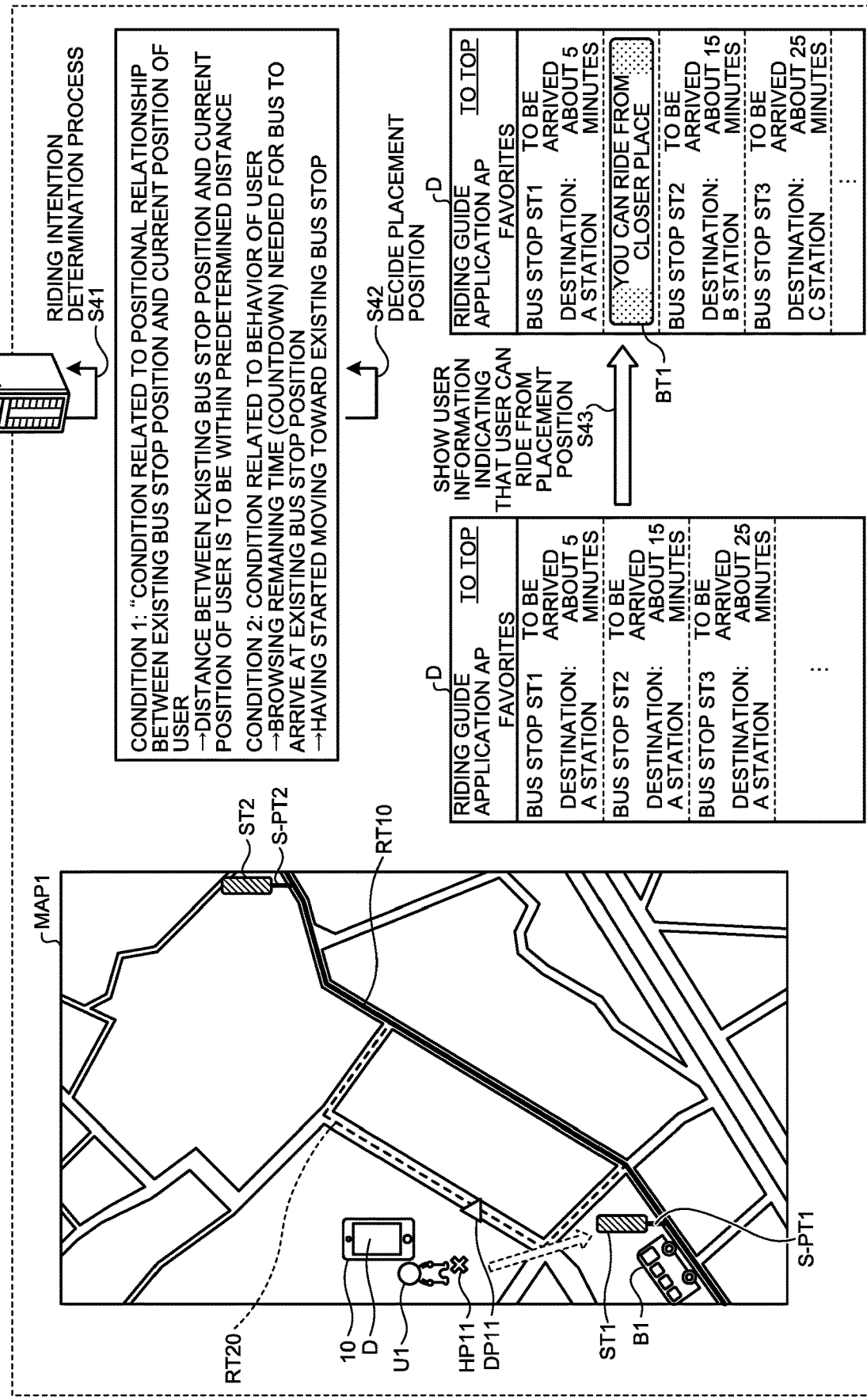
FIG. 14 is a diagram illustrating an example of a riding intention determination process according to a fourth embodiment.

FIG. 14 is a diagram illustrating an example of a riding intention determination process according to the fourth embodiment. A riding intention determination system according to the fourth embodiment includes the information processing apparatus 400 and the terminal device 10. The riding intention determination process according to the fourth embodiment is performed by the information processing apparatus 400 illustrated in FIG. 14. For example, the information processing apparatus 400 is an information processing apparatus that is implemented by a single or a plurality of devices, such as a server device or a cloud system, that can communicate with the terminal devices 10 used by the users via a network, such as a mobile communication network or a wireless LAN.

Here, an assumption when the information processing apparatus 400 according to the fourth embodiment performs the riding intention determination process will be described. First, in the embodiment, it is assumed that the moving vehicle targeted by the information processing apparatus 400 is an "on-demand bus". The on-demand bus according to the fourth embodiment is a type of a route bus and, if a user carries out a process by using a communication method, such as the Internet, the on-demand bus goes to pick up a user to, for example, a virtually placed bus station via, for example, a detour route that is other than the basic route. Hereinafter, the bus station that is virtually placed in this way is referred to as a "virtual bus stop" with respect to a physically placed bus station (existing bus stop) that is conventionally present in a basic route.

The information processing apparatus 400 can place a virtual bus stop at an arbitrary position by taking into account attribute information on a user, road information, traffic situation, and the like and allow the on-demand bus to head to the placed virtual bus stop. However, there may be a case in which, although the on-demand bus heads to the virtual bus stop by detouring from the basic route, the user who is originally supposed to ride on the on-demand bus is not present, resulting in a wasted trip. Namely, the operational efficiency of the on-demand bus becomes worse. To solve this situation, there is a need to accurately determine whether a user has an intention to ride on an on-demand bus. Then, if the user has an intention to ride on the on-demand bus, there is a need to place a "virtual bus stop" at the position that can be easily used by the user and guides the user to the placed position.

Based on the assumption described above, the information processing apparatus 400 according to the fourth embodiment acquires a positional relationship between the riding position information that indicates a riding point for a ride in a moving vehicle and the user position information that indicates the current position of the user and determines, based on the acquired positional relationship and the behavior information that indicates the behavior of the user, whether the user has an intention to ride in a moving vehicle.

Specifically, if the positional relationship satisfies the predetermined condition information, the information processing apparatus 400 determines that the user has an intention to ride in a moving vehicle. Furthermore, if the behavior information indicating the behavior of the user satisfies the predetermined condition information, the information processing apparatus 400 determines that the user has an intention to ride in the moving vehicle. The two conditions described above, i.e., the condition information related to the positional relationship and the condition information related to the behavior information will be described later. Furthermore, it is assumed that the moving vehicle is an on-demand bus. Furthermore, it is assumed that the riding point for a ride in the moving vehicle is a physical bus station, i.e., an existing bus stop, for a ride on the on-demand bus. Furthermore, it is assumed that the riding position information is the position information on the position of the existing bus stop (existing bus stop position). In a description below, an example of the riding intention determination process will be described with reference to FIG. 14.

First, the MAP1 illustrated in FIG. 17 will be described. The MAP1 illustrates the map around the user U1 who uses the riding guide application AP. In the MAP1, the position information on the position of the existing bus stop ST1 (an example of the riding position information) is "S-PT1". Furthermore, in the MAP1, the position information on the position of the existing bus stop ST2 (an example of the riding position information) is "S-PT2". Furthermore, in the MAP1, the current position of the user U1 who uses the riding guide application AP is "U-HP11". Furthermore, in the MAP1, the position information indicating the current position of the on-demand bus B1 is "B-PT1". Furthermore, in the MAP1, the basic route RT20 through which the on-demand bus B1 runs (can also be restated as the route of the path 20) is indicated by the dotted line.

In this state, the information processing apparatus 400 determines whether the user U1 has started up the riding guide application AP. Here, to simplify the explanation, it is assumed that, when the terminal device 10 receives an instruction to start up the riding guide application AP from the user U1, the terminal device 10 displays, on a display screen D, the information related to the existing bus stop that is previously stored by the user U1 as favorite registration. As illustrated in FIG. 14, regarding the name of the three existing bus stops (the bus stop ST1, the bus stop ST2, and the bus stop ST3) stored as favorite registration by the user U1 and the respective bus stops, the terminal device 10 displays the remaining time needed for the on-demand bus B1 to arrive at each of the bus stops in real time in a countdown display mode.

Furthermore, the reason that such a display is available is the following process is performed by the information processing apparatus 400. For example, the information processing apparatus 400 specifies, in accordance with a request from the terminal device 10, the on-demand bus that is stopping at each of the existing bus stops registered as favorite registration and acquires the current position information on the determined on-demand bus in real time at any time. Then, the information processing apparatus 400 calculates the remaining time based on the current position of the on-demand bus, the existing bus stop position, and the operation speed of the on-demand bus. Then, the information processing apparatus 400 sends the calculated remaining time back to the terminal device 10 so as to display in a countdown display mode.

Then, the information processing apparatus 400 performs the riding intention determination process (Step S41). The information processing apparatus 400 determines whether the positional relationship between the existing bus stop position and the current position of the user U1 satisfies the predetermined condition information (condition information related to the positional relationship). Specifically, the information processing apparatus 400 determines, as the predetermined condition information, whether the distance between the existing bus stop position and the current position of the user U1 is within the predetermined distance. Furthermore, in the embodiment, it is assumed the predetermined distance mentioned here is the distance that is estimated that the time needed for the user U1 to move from the current position of the user U1 to the existing bus stop position is shorter than the time needed for the on-demand bus B1 to arrive at the existing bus stop position.

For example, by acquiring the position information on the existing bus stops ST1 to ST3 registered as favorite registration and the current position information on the user U1, the information processing apparatus 400 acquires the positional relationship between the position information on each of the existing bus stops ST1 to ST3 and the current position information on the user U1. In the example illustrated in FIG. 1, it is assumed that, from among the existing bus stops ST1 to ST3, the information processing apparatus 400 determines that positional relationship between the position information on the existing bus stops ST1 and ST2 and the current position information on the user U1 satisfies the condition information related to the positional relationship described above.

Furthermore, the information processing apparatus 400 determines whether the behavior information indicating the behavior of the user U1 satisfies the predetermined condition information (condition information related to the behavior information). Specifically, the information processing apparatus 400 determines, as the predetermined condition information, whether the user U1 has browsed time information, i.e., the countdown display, indicating the time needed for the on-demand bus B1 to arrive at one of the existing bus stops between the existing bus stops ST1 and ST2 that are determined to satisfy the condition information related to the positional relationship. Furthermore, the information processing apparatus 400 determines, as the predetermined condition information, whether the user U1 has started moving toward the existing bus stop ST1 or ST2 in the state in which the user U1 is browsing the countdown display.

For example, by acquiring the current position information on the user U1 in real time at any time and by analyzing a change in the current position of the user U1, the information processing apparatus 400 determines whether the user U1 has started moving and determines, if the user U1 has started moving, which direction the user U1 moves. In the example illustrated in FIG. 14, it is assumed that the information processing apparatus 400 determines that the user U1 has started moving toward the existing bus stop ST1.

As described above, if both the condition information related to the positional relationship and the condition information on the behavior information are satisfied, the information processing apparatus 400 determines that the user U1 has an intention to ride on the on-demand bus B1. Thus, in the example illustrated in FIG. 14, the information processing apparatus 400 determines that the user U1 has an intention to ride on the on-demand bus B1.

Then, because the information processing apparatus 400 has determined that the user U1 has a riding intention, the information processing apparatus 400 performs the information processing for deciding the placement position in which the virtual bus stop is to be placed (Step S42). This information processing corresponds to the information processing described by using (a) illustrated in FIG. 1 and by using FIG. 2. For example, the information processing apparatus 400 acquires the attribute information on the user U1 and decides, based on the acquired attribute information, the placement position in which the virtual riding point that corresponds to a riding point that is used by the user U1 to ride in a moving vehicle and that is virtually set is placed. For example, based on the moving distance of the user and the user attribute information, the information processing apparatus 400 calculates a moving cost that is the cost needed for the user to move the moving distance. Then, the information processing apparatus 400 decides the placement position based on the calculated moving cost. In the example illustrated in FIG. 14, it is indicated an example in which, the information processing apparatus 400 decides the desired position "DP11" designated by the user U1 as the placement position.

As another example, the information processing apparatus 400 may also decide the placement position based on the attribute information on the user U1, the road information around the current position of the user U1 (for example, the area within the radius of 200 m centered at the current position of the user U1), and the traffic information on the site around the current position of the user. As an example, because the user U1 is moving toward the existing bus stop ST1, the information processing apparatus 400 may also decide the virtual bus stop position such that the distance from the current position of the user U1 to the virtual bus stop position is shorter than the distance from the current position of the user U1 to the position of the existing bus stop ST1.

Furthermore, after having decided the placement position, the information processing apparatus 400 shows the user U1 that the user U1 can ride on the on-demand bus B1 from the decided placement position (Step S43). For example, the information processing apparatus 400 controls the terminal device 10 such that the terminal device 10 displays, as the information indicating that a ride on the on-demand bus B1 from the placement position is possible, as illustrated in FIG. 14, a button BT1 with a message "you can ride from a closer place" is displayed. Furthermore, although not illustrated, the information processing apparatus 400 instructs the on-demand bus B1 to detour to the route RT20 in which the desired position "DP11" that has been decided as the placement position is positioned.

As described above, the information processing apparatus 400 according to the fourth embodiment acquires the positional relationship between the riding position information indicating the riding point that is used for a ride in a moving vehicle and the user position information indicating the current position of a user and determines, based on the acquired positional relationship and based on the behavior information indicating the behavior of the user, whether the user has an intention to ride in the moving vehicle.

Consequently, because the information processing apparatus 400 according to the fourth embodiment can determine, with high accuracy, the user who has a riding intention, the information processing apparatus 400 can effectively avoid the situation in which, for example, in spite of having detoured, a user is not present at the point of the detour destination, which results in a wasted trip. Thus, the information processing apparatus 400 can efficiently transport the user to the destination.

Furthermore, the information processing apparatus 400 according to the fourth embodiment can shorten the moving distance to a bus stop because there may be a case in which a virtual bus stop can be placed at the position that is closer than that of the existing bus stop position. Namely, the information processing apparatus 400 can enhance the convenience of users who use an on-demand bus.

2. Configuration of the Information Processing Apparatus

Figure 15:
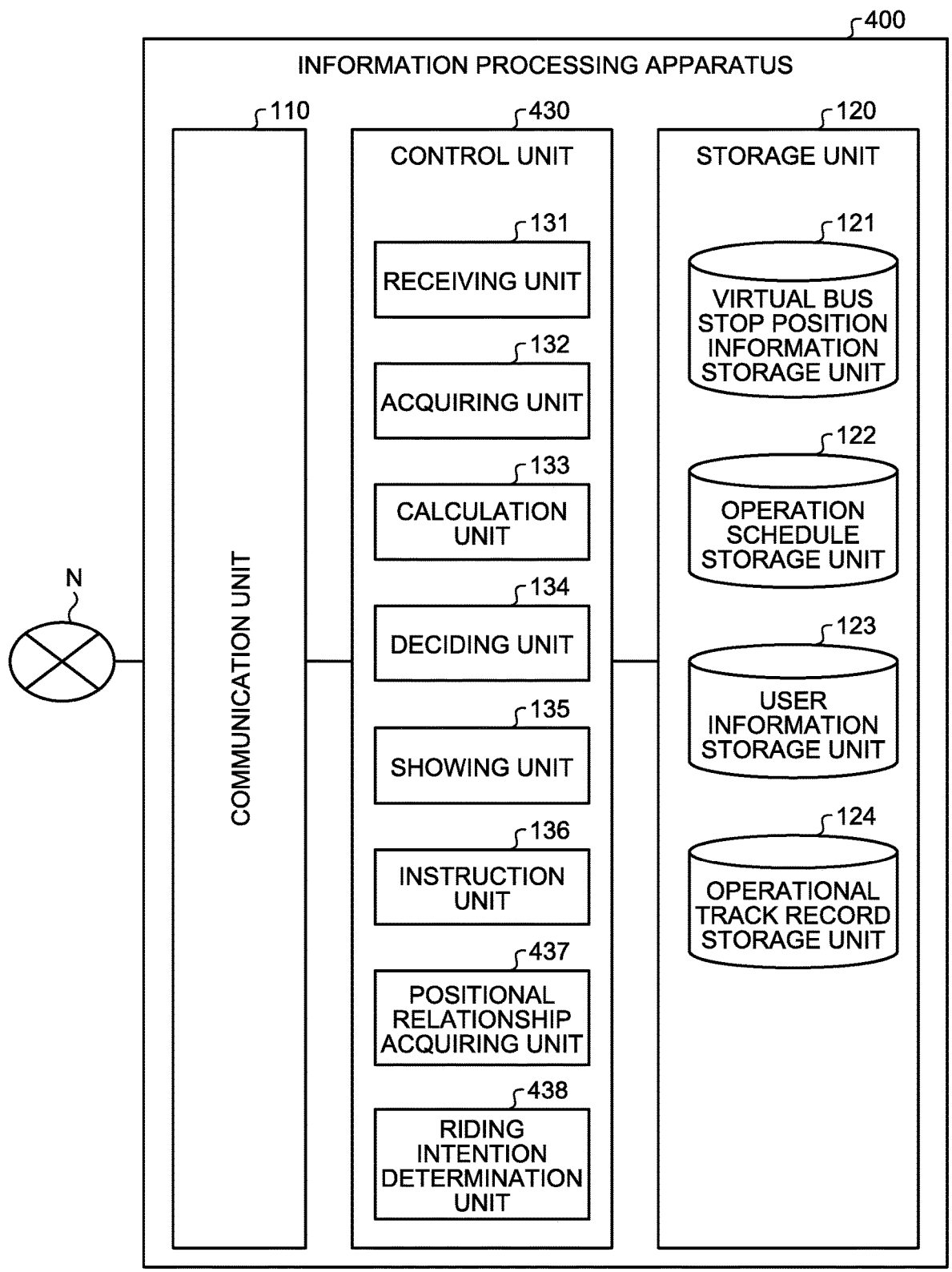
FIG. 15 is a diagram illustrating a configuration example of an information processing apparatus 400 according to the fourth embodiment.

In the following, the information processing apparatus 400 according to the fourth embodiment will be described by using FIG. 15. FIG. 15 illustrates a configuration example of the information processing apparatus 400 according to the fourth embodiment. As illustrated in FIG. 15, the information processing apparatus 400 includes the communication unit 110, the storage unit 120, and a control unit 430.

The information processing apparatus 400 according to the fourth embodiment further includes, in addition to the units included in the information processing apparatus 100 described in the first embodiment, a positional relationship acquiring unit 437 and a riding intention determination unit 438. Thus, descriptions of the overlapped processing units in each of the embodiments described above will be omitted.

Control Unit 430

The control unit 430 is implemented by a CPU, an MPU, or the like, executing various kinds of programs, which are stored in a storage device in the information processing apparatus 400, by using a RAM as a work area. Furthermore, the control unit 430 is implemented by, for example, an integrated circuit, such as an ASIC or an FPGA.

As illustrated in FIG. 15, the control unit 430 includes the receiving unit 131, the acquiring unit 132, the calculation unit 133, the deciding unit 134, the showing unit 135, the instruction unit 136, the positional relationship acquiring unit 437, and the riding intention determination unit 438 and implements or executes the function or the operation of the information processing described below. Furthermore, the internal configuration of the control unit 430 is not limited to the configuration illustrated in FIG. 15 and another configuration may also be used as long as the configuration in which the information processing described below is performed is used. Furthermore, the connection relation between each of the processing units included in the control unit 430 is not limited to the connection relation illustrated in FIG. 15 and another connection relation may also be used.

Positional Relationship Acquiring Unit 437

The positional relationship acquiring unit 437 acquires the positional relationship between the riding position information indicating the riding point for riding in a moving vehicle and the user position information indicating the current position of a user. Furthermore, the positional relationship acquiring unit 437 may also acquire the moving vehicle position information indicating the current position of a moving vehicle. Furthermore, the positional relationship acquiring unit 437 can also calculate, based on the acquired information, the information that is shown to the user. When a description will be given by using an example illustrated in FIG. 15, the positional relationship acquiring unit 437 can calculate the remaining time for which the on-demand bus B1 arrives at each of the existing bus stops ST1 to ST3. Furthermore, the acquiring process performed by the positional relationship acquiring unit 437 may also be performed by, for example, the acquiring unit 132.

Riding Intention Determination Unit 438

The riding intention determination unit 438 determines, based on the positional relationship acquired by the positional relationship acquiring unit 437 and based on the behavior information indicating the behavior of a user, whether the user has an intention to ride in the moving vehicle. Specifically, if the positional relationship acquired by the positional relationship acquiring unit 437 satisfies the predetermined condition information, the riding intention determination unit 438 determines that the user has an intention to ride in the moving vehicle.

For example, as the case in which the predetermined condition information is satisfied, if the distance between the riding point that is used to ride in the moving vehicle and the current position of the user is within the predetermined distance, the riding intention determination unit 438 determines that the user has an intention to ride in the moving vehicle. This point will be described in more detail. If, as the predetermined distance, the distance that is estimated that the time needed for the user to move from the current position of the user to the riding point is within the predetermined time, the riding intention determination unit 438 determines that the user has an intention to ride in the moving vehicle. Furthermore, the predetermined time mentioned here is the time for which the moving vehicle arrives at the riding point.

Furthermore, if the behavior information indicating the behavior of the user satisfies the predetermined condition information, the riding intention determination unit 438 determines that the user has an intention to ride in the moving vehicle. Specifically, as the case in which the predetermined condition information is satisfied, if the user has browsed the content related to the riding point that is used to ride in the moving vehicle, the riding intention determination unit 438 determines that the user has an intention to ride in the moving vehicle.

Furthermore, as the case in which the predetermined condition information is satisfied, from among the riding points for riding in the moving vehicle, if the user has browsed the time information indicating the time for which the moving vehicle arrives at the riding point in which the distance with the current position of the user is within the predetermined distance, the riding intention determination unit 438 determines that the user has an intention to ride in the moving vehicle. More specifically, in the state in which the user has browsed the time information described above, if the user starts moving toward the riding point for riding in the moving vehicle, the riding intention determination unit 438 determines that the user has an intention to ride in the moving vehicle.

3. Example of the Operation in the Riding Intention Determination Process

Figure 16:
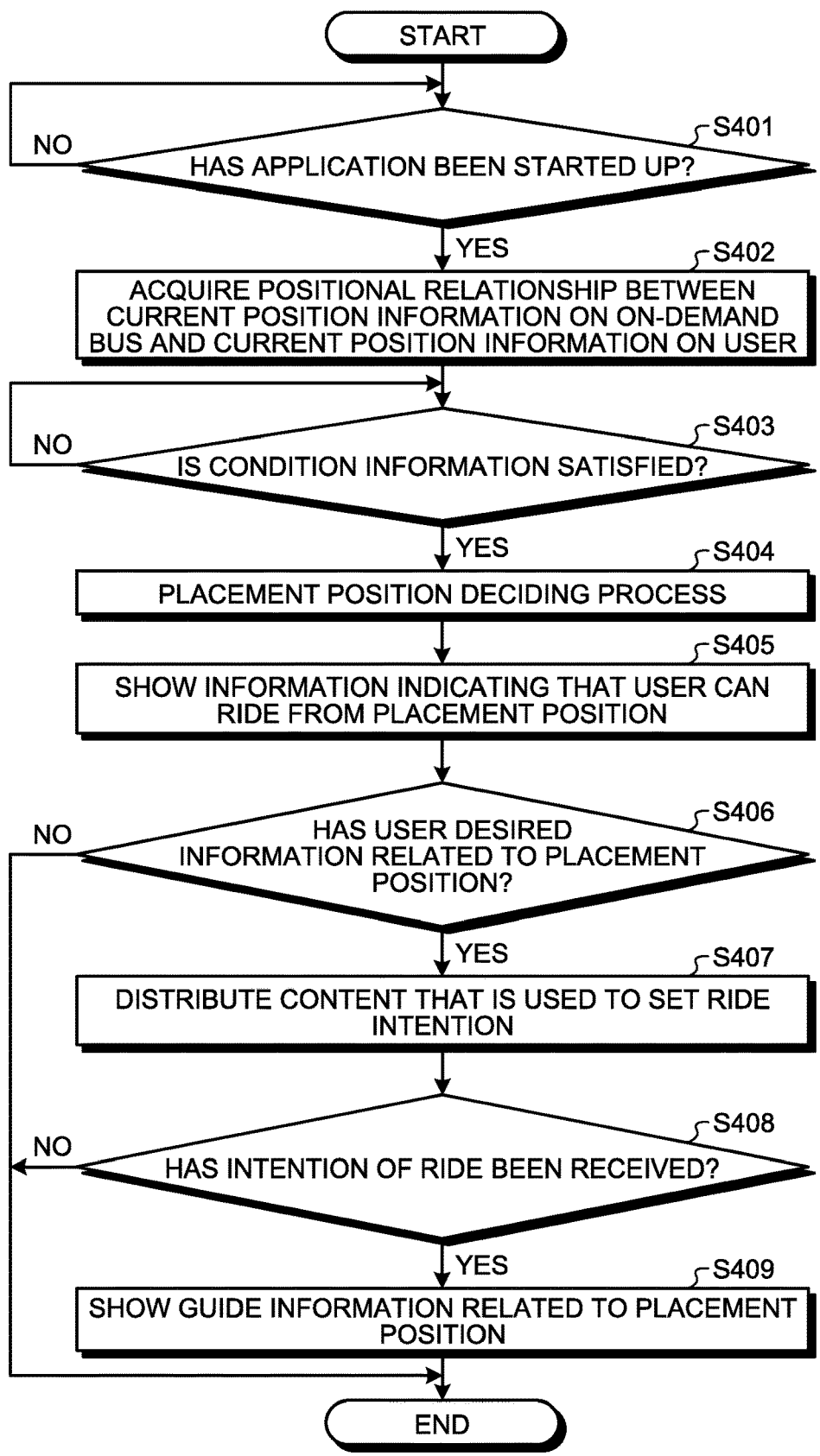
FIG. 16 is a flowchart illustrating an example of a riding intention determination process according to the fourth embodiment.

In the following, the content of the process implemented and performed by each of the processing units (in particular, the positional relationship acquiring unit 437 and the riding intention determination unit 438) will be described by using the flowchart illustrated in FIG. 16. FIG. 16 is a flowchart illustrating an example of the riding intention determination process according to the fourth embodiment. Furthermore, the example illustrated in FIG. 14 will appropriately be used.

First, the receiving unit 131 determines whether information indicating that the riding guide application AP has been started up is received from the terminal device 10 held by each of the users (Step S401). If the receiving unit 131 does not receive the information indicating that the riding guide application AP has been started up (No at Step S401), the receiving unit 131 waits until the receiving unit 131 receives the information. Here, for example, it is assumed that the receiving unit 131 has received, from the terminal device 10 held by the user U1, the information indicating that the riding guide application AP has been started up.

Here, it is assumed that the user U1 has registered, in the riding guide application AP, the existing bus stops ST1, ST2, and ST3 (ST1 to ST3) as favorite registration. If the information indicating that the riding guide application AP has been started up is received by the receiving unit 131 (Yes at Step S401), the positional relationship acquiring unit 437 specifies the on-demand bus that is going to stop at the existing bus stops ST1 to ST3 and acquires the current position information on the specified on-demand buses in real time at any time. Then, based on the current position of the on-demand bus B1 determined to be stopped at the existing bus stops ST1 to ST3, the position information on each of the existing bus stops ST1 to ST3, and the operation speed of the on-demand bus B1, the positional relationship acquiring unit 437 calculates the remaining time needed for the on-demand bus B1 to arrive at each of the existing bus stops ST1 to ST3.

As illustrated in FIG. 14, the showing unit 135 distributes, to the terminal devices 10, the content (favorites screen) that is controlled such that the remaining time needed for the on-demand bus B1 to arrive at each of the existing bus stops ST1 to ST3 is displayed in the countdown display mode.

In this state, the riding intention determination unit 438 determines, as the riding intention determination process, whether the user U1 satisfies the predetermined condition information. First, the positional relationship acquiring unit 437 acquires the positional relationship between the position information on each of the existing bus stops ST1 to ST3 that are the riding points for riding on the on-demand bus B1 (collectively referred to as the existing bus stop positions) and the current position information on the user U1 (Step S402). Furthermore, in order for the positional relationship acquiring unit 437 to acquire the position information on the existing bus stop position, the information processing apparatus 400 can store the position information on the existing bus stop positions in a predetermined storage unit included in the own device.

Then, the riding intention determination unit 438 determines, as the riding intention determination process, whether the user U1 satisfies the predetermined condition information (Step S403). Specifically, the riding intention determination unit 438 determines whether the positional relationship between the existing bus stop position and the current position of the user U1 satisfies the predetermined condition information (condition information related to the positional relationship). Specifically, as the predetermined condition information, the riding intention determination unit 438 determines whether the distance between the existing bus stop position and the current position of the user U1 is within the predetermined distance. More specifically, as the predetermined distance, the riding intention determination unit 438 determines whether the distance is within the range in which the time needed for the user U1 to move from the current position of the user to the existing bus stop position is estimated within the predetermined time. Furthermore, the predetermined time mentioned here is, for example, the time needed for the on-demand bus B1 to arrive at the existing bus stop position. Here, it is assumed that, from among the existing bus stops ST1 to ST3, the riding intention determination unit 438 determines that the positional relationship between the position information on the existing bus stops ST1 and ST2 and the current position information on the user U1 satisfies the condition information related to the positional relationship described above.

Furthermore, the riding intention determination unit 438 determines whether the behavior information indicating the behavior of the user U1 satisfies the predetermined condition information (condition information related to the behavior information). Specifically, the riding intention determination unit 438 determines, as the predetermined condition information, whether the user U1 has browsed the time information, i.e., the countdown display, indicating the time needed for the on-demand bus B1 to arrive at one of the existing bus stops between the existing bus stops ST1 and ST2 that are determined to satisfy the condition information related to the positional relationship. More specifically, the riding intention determination unit 438 determines, as the predetermined condition information, whether the user U1 has started moving toward the existing bus stop ST1 or ST2 in the state in which the user U1 is browsing the countdown display. Here, it is assumed that the riding intention determination unit 438 determines that the user U1 has started moving toward the existing bus stop ST1.

In the example described here, because both the condition information related to the positional relationship and the condition information related to the behavior information are satisfied, the riding intention determination unit 438 determines that the user U1 has an intention to ride on the on-demand bus B1. Furthermore, if the riding intention determination unit 438 determines that the condition information is not satisfied (No at Step S103), the riding intention determination unit 438 waits until the condition information is satisfied. Alternatively, if the riding intention determination unit 438 determines that the condition information is not satisfied (No at Step S403), the riding intention determination unit 438 may also end the process. In response to the determination, obtained by the riding intention determination unit 438, that the user U1 has an intention to ride on the on-demand bus B1 (Yes at Step S103), the deciding unit 134 performs information processing (placement position decision) for deciding the position in which a virtual bus stop is to be placed (Step S404). The flow of the placement position deciding process in detail is the same as that described with reference to FIG. 8 and corresponds to the series of steps of the information processing performed by, for example, the acquiring unit 132, the calculation unit 133, and the deciding unit 134. Here, it is assumed that the deciding unit 134 decides, as explained in the example illustrated in FIG. 14, the desired position "DP11" designated by the user U1 as the placement position.

In such a case, the showing unit 135 shows the user U1 that the user U1 can ride on the on-demand bus B1 from the placement position "DP11" that is decided by the deciding unit 134 (Step S405). For example, as illustrated in FIG. 14, the showing unit 135 controls a display, as the information indicating that a ride on the on-demand bus B1 from the placement position "DP11" is possible, the button BT1 with a message "you can ride from a closer place" is displayed. Then, as illustrated in FIG. 14, the showing unit 135 displays the button BT1, which is controlled to be displayed, between the information related to the existing bus stop ST1 and the information related to the existing bus stop ST2.

In this state, the showing unit 135 determines whether the user has desired detailed information related to the placement position "DP11" (Step S406). In other words, the showing unit 135 determines whether the user U1 has pressed the button BT1. If the showing unit 135 determines that the button BT1 is not pressed (No at Step S406), the showing unit 135 ends the process. In contrast, if the showing unit 135 determines that the button BT1 has been pressed (Yes at Step S406), the showing unit 135 distributes the content (assumed to be content C) that is used to allow the user U1 to indicate the intention to ride from the placement position "DP11" (Step S407).

For example, the user U1 can indicate, to the information processing apparatus 400 via the content C, that the user U1 has an intention to ride from the placement position "DP11". Thus, the showing unit 135 determines whether the indication of intention of a ride has been received (Step S408). If the showing unit 135 determines that the indication of intention has not been received (No at Step S408), the showing unit 135 ends the process. In contrast, if the showing unit 135 determines that the indication of intention has been received (Yes at Step S108), the showing unit 135 shows the guide information related to the placement position "DP11" (Step S409). For example, the showing unit 135 displays, as the guide information, a moving route GD from the current position "HP11" of the user U1 to the desired position "DP11".

Furthermore, although not illustrated, if the indication of intention has been received, the deciding unit 134 finalizes the decision such that the virtual bus stop is to be placed at the desired position "DP11" and allows the virtual bus stop to actually appear at this position. Furthermore, based on the appearance of the virtual bus stop by the deciding unit 134 in this way, the information processing apparatus 400 performs control such that the virtual bus stop has been placed at the position "DP11" can be recognized by the other users other than the user U1 (for example, the other users who install the "riding guide application AP" in their terminal devices 10) and a riding desire from the position "DP11" can be shown from the other users.

4. Effects

The information processing apparatus 400 according to the fourth embodiment includes the positional relationship acquiring unit 437 and the riding intention determination unit 438. The positional relationship acquiring unit 437 acquires the positional relationship between the riding position information that indicates the riding point for riding a moving vehicle and the user position information that indicates the current position of a user. The riding intention determination unit 438 determines, based on the positional relationship acquired by the positional relationship acquiring unit 437 and based on the behavior information indicating the behavior of the user, whether the user has an intention to ride in the moving vehicle.

Consequently, the information processing apparatus 400 according to the fourth embodiment can determine, with high accuracy, whether a riding intention is present, thereby increasing the operational efficiency of the moving vehicle.

Furthermore, if the positional relationship acquired by the positional relationship acquiring unit 437 satisfies the predetermined condition information, the riding intention determination unit 438 determines that the user has an intention to ride in a moving vehicle.

Consequently, the information processing apparatus 400 according to the fourth embodiment can determine, with high accuracy, whether a riding intention is present.

Furthermore, in the case in which the predetermined condition information is satisfied, when the distance between the riding point for riding in the moving vehicle and the current position of the user is within the predetermined distance, the riding intention determination unit 438 determines that the user has an intention to ride in the moving vehicle.

For example, if the user is positioned around the riding point of the moving vehicle, the user is highly likely to ride in the moving vehicle. Thus, the information processing apparatus 400 according to the fourth embodiment can determine, with high accuracy, whether a riding intention is present.

Furthermore, as the predetermined distance, if the distance that is estimated that the time needed for the user to move from the current position of the user to the riding point is within the predetermined time, the riding intention determination unit 438 determines that the user has an intention to ride in the moving vehicle.

For example, if the user is present at the distance that is estimated that the time needed for the user to move to the riding point of the moving vehicle is within the predetermined time, the user is highly likely to ride in the moving vehicle. Thus, the information processing apparatus 400 according to the fourth embodiment can determine, with high accuracy, whether a riding intention is present.

Furthermore, if, as the distance, the distance that is estimated that the time needed for the moving vehicle to arrive at the riding point is within the predetermined time, the riding intention determination unit 438 determines that the user has an intention to ride in the moving vehicle.

For example, if the user is present at the position from where the user can arrive at the bus stop earlier than the time at which the moving vehicle arrives at the riding point, the user is highly likely to ride in the moving vehicle. Thus, the information processing apparatus 400 according to the fourth embodiment can determine, with high accuracy, whether a riding intention is present.

Furthermore, if the behavior information indicating the behavior of the user satisfies the predetermined condition information, the riding intention determination unit 438 determines that the user has an intention to ride in the moving vehicle.

Consequently, by also considering the condition information related to the behavior information on the user, in addition to the condition information related to the positional relationship, the information processing apparatus 400 according to the fourth embodiment can determine, with high accuracy, whether a riding intention is present.

Furthermore, in the case where the predetermined condition information is satisfied, if the user browses the content related to the riding point for riding in the moving vehicle, the riding intention determination unit 438 determines that the user has an intention to ride in the moving vehicle.

The user who browses the content related to the riding point for riding in the moving vehicle is highly likely to going to ride in the moving vehicle. Thus, the information processing apparatus 400 according to the fourth embodiment can determine, with high accuracy, whether a riding intention is present.

Furthermore, as in the case where the predetermined condition information is satisfied, from among the riding points that is used to ride in the moving vehicle, if the user browses the time information that indicates the time needed for the moving vehicle to arrive at the riding point whose distance to the current position of the user is within the predetermined distance, the riding intention determination unit 438 determines that the user has an intention to ride in the moving vehicle.

The user who browses the time information that indicates the time needed for the moving vehicle to arrive at the riding point is highly likely to going to ride in the moving vehicle. Thus, the information processing apparatus 400 according to the fourth embodiment can determine, with high accuracy, whether a riding intention is present.

Furthermore, in the case where the predetermined condition information is satisfied, if the user has started moving toward the riding point for riding in the moving vehicle, the riding intention determination unit 438 determines that the user has an intention to ride in the moving vehicle.

The user who has started moving toward the riding point for riding in the moving vehicle is highly likely to going to ride in the moving vehicle. Thus, the information processing apparatus 400 according to the fourth embodiment can determine, with high accuracy, whether a riding intention is present.

Others

1. Moving Vehicle

In each of the embodiments, the description has been given by using an on-demand bus as an example of the moving vehicle; however, the type of the moving vehicle is not limited to the on-demand bus. For example, the moving vehicle may also be a shared taxi. Furthermore, the moving vehicle may also be a manned automobile in which a driver is present or may also be a self-guided automobile in which no driver is present.

2. Hardware Configuration

Figure 17:
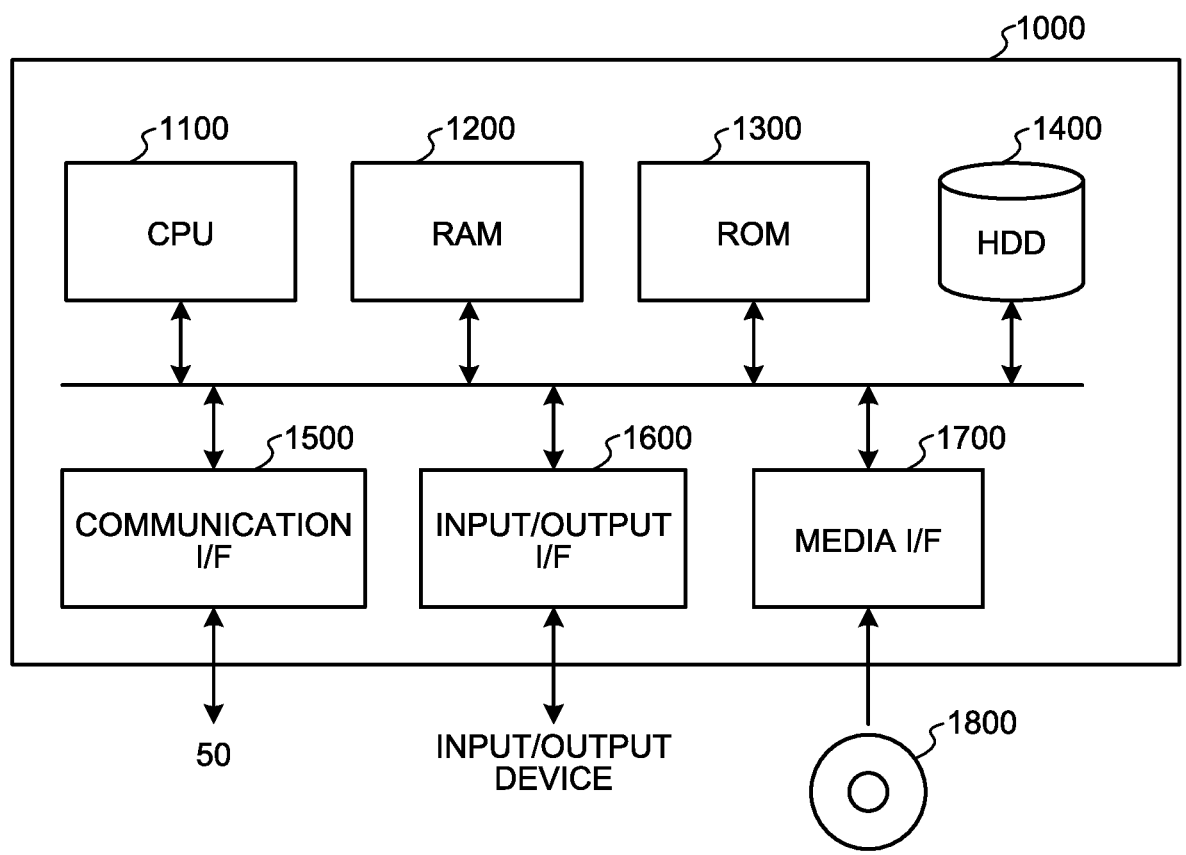
FIG. 17 is a diagram illustrating an example of the hardware configuration of a computer that implements the function of the information processing apparatus.

Furthermore, the information processing apparatuses 100, 200, and 300 according to each of the embodiments described above is implemented by a computer 1000 having the configuration illustrated in, for example, FIG. 17. In the following, the information processing apparatus 100 will be described by using an example. FIG. 17 is a diagram illustrating an example of the hardware configuration of the computer 1000 that implements the function of the information processing apparatus 100. The computer 1000 includes a CPU 1100, a RAM 1200, a ROM 1300, an HDD 1400, a communication interface (I/F) 1500, an input/output interface (I/F) 1600, and a media interface (I/F) 1700.

The CPU 1100 is operated based on the programs stored in the ROM 1300 or the HDD 1400 and controls each of the units. The ROM 1300 stores therein a boot program that is executed by the CPU 1100 when the computer 1000 is started up, a program dependent on the hardware of the computer 1000, and the like.

The HDD 1400 stores therein a program executed by the CPU 1100, data used by the program, or the like. The communication interface 1500 receives data from other devices via a communication network 50, sends the data to the CPU 1100, and sends the data created by the CPU 1100 to the other devices via the communication network 50.

The CPU 1100 controls an output device, such as a display or a printer, or an input device, such as a keyboard or a mouse, via the input/output interface 1600. The CPU 1100 acquires data from the input device via the input/output interface 1600. Furthermore, the CPU 1100 outputs the created data to the output device via the input/output interface 1600.

The media interface 1700 reads a program or data stored in a recording medium 1800 and provides the program or the data to the CPU 1100 via the RAM 1200. The CPU 1100 loads the program from the recording medium 1800 in the RAM 1200 via the media interface 1700 and executes the loaded program. The recording medium 1800 is, for example, an optical recording medium, such as a digital versatile disc (DVD) or a phase change rewritable disk (PD), a magneto optical recording medium, such as a magneto-optical disk (MO), a tape medium, a magnetic recording medium, a semiconductor memory, or the like.

For example, when the computer 1000 functions as the information processing apparatus 100 according to the first embodiment, the CPU 1100 in the computer 1000 implements the functions of the control unit 130 by executing a program loaded in the RAM 1200. Furthermore, the HDD 1400 stores therein data stored in the storage unit 120. The CPU 1100 in the computer 1000 reads the program from the recording medium 1800 and executes the program. For another example, the program may also be acquired from other devices via the communication network 50.

Furthermore, for example, when the computer 1000 functions as the information processing apparatus 200 according to the second embodiment, the CPU 1100 in the computer 1000 implements the functions of the control unit 230 by executing a program loaded in the RAM 1200.

3. Others

Of the processes described in the embodiment, the whole or a part of the processes that are mentioned as being automatically performed can also be manually performed, or the whole or a part of the processes that are mentioned as being manually performed can also be automatically performed using known methods. Furthermore, the flow of the processes, the specific names, and the information containing various kinds of data or parameters indicated in the above specification and drawings can be arbitrarily changed unless otherwise stated.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

Furthermore, the embodiments described above may be appropriately used in combination as long as the processes do not conflict with each other.

In the above, embodiments of the present application have been described in detail based on the drawings; however the embodiments are described only by way of an example. In addition to the embodiments described in disclosure of invention, the present invention can be implemented in a mode in which various modifications and changes are made in accordance with the knowledge of those skilled in the art.

Furthermore, the "components (sections, modules, units)" described above can be read as "means", "circuits", or the like. For example, an acquiring unit can be read as an acquiring means or an acquiring circuit.

According to an aspect of an embodiment, an advantage is provided in that it is possible to enhance the convenience of users who use moving vehicles.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a processor programmed to:
   acquire attribute information indicating a plurality of characteristics, for each of a plurality of users;
   calculate a score for each user of the plurality of users, based on the plurality of characteristics for each corresponding user, the score having a positive correlation with a burden imposed on the user during walking, such that a higher score indicates a higher burden on the user;
   calculate, for each user of the plurality of users, based on (i) a moving distance of the user from a current position of the user to a position indicated by a position information of the user and (ii) the score for the corresponding user, a moving cost that represents a degree of difficulty required for the user to move the moving distance;
   determine, based on the calculated moving costs for each user, a plurality of placement positions in which virtual riding points that corresponds to riding points that are used for the users to ride in a moving vehicle and that are virtually set are placed, the plurality of placement positions being determined such that a sum total of the moving cost of each of the plurality of the users is a minimum, the plurality of placement positions defining a route for the moving vehicle such that the moving vehicle can pick up the plurality of users along the route;
   transmit an instruction to the moving vehicle that instructs the moving vehicle to travel along the route and stop at the plurality of placement positions, the moving vehicle being a self-driving vehicle that navigates based on the transmitted instruction; and
   instruct a terminal device having a display to display to a user from among the plurality of users, map information that guides the user from the current position of the user to a placement position from among the plurality of placement positions determined by the processor.

2. The information processing apparatus according to claim 1, wherein, when a riding reservation for the moving vehicle made by a user from among the plurality of users is accepted by the processor, the processor determines the moving cost for the user based on the moving distance of the user to a position indicated by desired riding position information as the position information, and the score for the user, wherein the desired riding position information indicates a position desired by the user to ride in the moving vehicle and was designated by the user at the time of the riding reservation.

3. The information processing apparatus according to claim 1, wherein, when an instruction given by a user from among the plurality of users to send the moving vehicle to a current position of the user is accepted by the processor, the processor is further programmed to determine a placement position from among the plurality of placement positions, for the user, based on the current position of the user, and the score for the user.

4. The information processing apparatus according to claim 1, wherein, when a virtual riding point is placed, the processor determines, based on a waiting time of a user from among the plurality of users estimated at the placement position in which the virtual riding point was placed, a placement position for the user in which the virtual riding point is to be placed, wherein the waiting time is estimated based on speed of the moving vehicle, a distance from a current position of the moving vehicle to the virtual riding point, moving speed of the user, and a distance from a current position of the user to the virtual riding point.

5. The information processing apparatus according to claim 1, wherein, when a destination designated by a user from among the plurality of users is accepted by the processor, the processor determines a placement position for the user based on the destination designated by the user and the calculated moving cost for the user.

6. The information processing apparatus according to claim 5, wherein the processor determines, for the moving vehicle, the placement position for the user in which the virtual riding point that corresponds to the riding point that is used to ride in the moving vehicle associated with the destination and that is virtually set is placed.

7. The information processing apparatus according to claim 1, wherein, when an expected departure time of a user from among the plurality of users or a desired arrival time to a destination is designated by the user, the processor determines a placement position for the user based on the expected departure time or the desired arrival time designated by the user, and the calculated moving cost.

8. The information processing apparatus according to claim 7, wherein the processor determines, as the placement position for the user, a predetermined position from among the positions in which the moving vehicle can arrive within a predetermined time after the expected departure time of the user.

9. The information processing apparatus according to claim 1, wherein, as the attribute information for each user, the processor is programmed to acquire age information user, gender information, information related to a health condition, information on a physical disability, and information indicating whether or not an infant accompanies each user.

10. The information processing apparatus according to claim 1, wherein
the plurality of characteristics include age information for each user and information indicating whether each user has a physical disability, and
the score is calculated based on the age information and the information indicating whether the user has the physical disability.

11. The information processing apparatus according to claim 1, wherein
the moving cost is calculated by multiplying the moving distance and the score.

12. The information processing apparatus according to claim 1, wherein the processor is programmed to:
determine current positions of each of the plurality of users, based on information received from a terminal device associated with each corresponding user, and
instruct a plurality of terminal devices each having a display to display to each corresponding user from among the plurality of users, map information that guides each corresponding user from the current position of the user to a placement position from among the plurality of placement positions determined by the processor.

13. An information processing method performed by an information processing apparatus, the information processing method comprising:
acquiring attribute information indicating a plurality of characteristics for each of a plurality of users;
calculating a score for each user of the plurality of users, based on the plurality of characteristics for each corresponding user, the score having a positive correlation with a burden imposed on the user during walking, such that a higher score indicates a higher burden on the user;
calculating, for each user of the plurality of users, based on (i) a moving distance of the user from a current position of the user to a position indicated by a position information of the user and (ii) the score for the corresponding user, a moving cost that represents a degree of difficulty required for the user to move the moving distance;
determining, based on the calculated moving costs for each user, a plurality of placement positions in which a virtual riding points that corresponds to riding points that are used for the users to ride in a moving vehicle and that are virtually set are placed, the plurality of placement positions being determined such that a sum total of the moving cost of each of the plurality of the users is a minimum, the plurality of placement positions defining a route for the moving vehicle such that the moving vehicle can pick up the plurality of users along the route;
transmitting an instruction to the moving vehicle that instructs the moving vehicle to stop at the plurality of placement positions, the moving vehicle being a self-driving vehicle that navigates based on the transmitted instruction; and
instructing a terminal device having a display to display to a user from among the plurality of users, map information that guides the user from the current position of the user to a placement position from among the plurality of placement positions that are determined.

14. A non-transitory computer-readable storage medium having stored therein an information processing program that causes a computer to execute a process comprising:
acquiring attribute information indicating a plurality of characteristics for each of a plurality of users;
calculating a score for each user of the plurality of users, based on the plurality of characteristics for each corresponding user, the score having a positive correlation with a burden imposed on the user during walking, such that a higher score indicates a higher burden on the user;
calculating, for each user of the plurality of users, based on (i) a moving distance of the user from a current position of the user to a position indicated by a position information of the user and (ii) the score for the corresponding user, a moving cost that represents a degree of difficulty required for the user to move the moving distance;
determining, based on the calculated moving costs for each user, a plurality of placement positions in which a virtual riding points that corresponds to riding points that are used for the users to ride in a moving vehicle and that are virtually set are placed, the plurality of placement positions being determined such that a sum total of the moving cost of each of the plurality of the users is a minimum, the plurality of placement positions defining a route for the moving vehicle such that the moving vehicle can pick up the plurality of users along the route;
transmitting an instruction to the moving vehicle that instructs the moving vehicle to stop at the plurality of placement positions the moving vehicle being a self-driving vehicle that navigates based on the transmitted instruction; and
instructing a terminal device having a display to display to a user from among the plurality of users, map information that guides the user from the current position of the user to a placement position from among the plurality of placement positions that are determined.

* * * * *